US012760173B2

(12) United States Patent
Loyd et al.

(10) Patent No.: US 12,760,173 B2
(45) Date of Patent: Oct. 13, 2026

(54) ETHYLENE-BASED COPOLYMER AND PROPYLENE-ALPHA-OLEFIN-DIENE COMPOSITIONS FOR USE IN LAYERED ARTICLES

(71) Applicant: ExxonMobil Chemical Patents Inc., Baytown, TX (US)

(72) Inventors: Scott H Loyd, League City, TX (US); Milind Balwant Joshi, Karnataka (IN); Xiao Bo Peng, Shanghai (CN); Felix Manuel Zacarias, Houston, TX (US); Narayanaswami Dharmarajan, Houston, TX (US); Rainer Kolb, Kingwood, TX (US); David William Abmayr, Houston, TX (US); Zhifeng Bai, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 624 days.

(21) Appl. No.: 18/015,565

(22) PCT Filed: Jul. 16, 2021

(86) PCT No.: PCT/US2021/041908
§ 371 (c)(1),
(2) Date: Jan. 11, 2023

(87) PCT Pub. No.: WO2022/020187
PCT Pub. Date: Jan. 27, 2022

(65) Prior Publication Data

US 2023/0250268 A1 Aug. 10, 2023

Related U.S. Application Data

(60) Provisional application No. 63/055,665, filed on Jul. 23, 2020.

(51) Int. Cl.
*C08L 23/16* (2006.01)
*B32B 1/08* (2006.01)
(Continued)

(52) U.S. Cl.
CPC ................ *C08L 23/16* (2013.01); *B32B 1/08* (2013.01); *B32B 5/02* (2013.01); *B32B 25/042* (2013.01);
(Continued)

(58) Field of Classification Search
CPC ... C08L 23/16; B32B 1/08; B32B 5/02; B32B 25/042; B32B 2262/00; B32B 2305/18;
(Continued)

(56) References Cited

U.S. PATENT DOCUMENTS 5,571,868 A 11/1996 Datta et al.
5,654,370 A 8/1997 Datta et al.
(Continued)

FOREIGN PATENT DOCUMENTS

WO 2018/190940 10/2018
WO WO2019/112728 * 6/2019 ............. C08L 23/16
WO 2019/182949 9/2019

OTHER PUBLICATIONS

J. Beatty, "Tel-Tak: A Mechanical Method for Estimating Both Tackiness and Stickness of Rubber Compounds", Rubber Chemistry and Technology, vol. 42, pp. 1040-1053 (1969).
(Continued)

*Primary Examiner* — Michael C Miggins
(74) *Attorney, Agent, or Firm* — Fletcher Yoder, P.C.

(57) ABSTRACT

An elastomeric composition suitable for use in layered articles like hoses and belts may include: 5 phr to 80 phr of a PEDM terpolymer comprising 55 wt % to 95 wt % propylene, 2.5 wt % to 40 wt % α-olefin, and 0.05 wt % to 25 wt % diene and having Mooney viscosity (ML(1+4)) of
(Continued)

5 MU to 90 MU; 20 phr to 95 phr of an ethylene-based copolymer selected from: (a) a crystalline ethylene-based copolymer comprising 60 wt % to 95 wt % ethylene, 0 wt % to 10 wt % of one or more dienes, and 5 wt % to 40 wt % C3 to C12 α-olefin, (b) an amorphous ethylene-based comprising 40 wt % to 59 wt % ethylene, 0 wt % to 10 wt % of one or more dienes, and 40 wt % to 60 wt % C3 to C12 α-olefin, and (c) a combination of (a) and (b); and 10 phr to 200 phr of a process oil.

23 Claims, 4 Drawing Sheets

(51) Int. Cl.
*B32B 5/02* (2006.01)
*B32B 25/04* (2006.01)
*C08K 3/04* (2006.01)

(52) U.S. Cl.
CPC ............ *C08K 3/04* (2013.01); *B32B 2262/00* (2013.01); *B32B 2305/18* (2013.01); *B32B 2597/00* (2013.01)

(58) Field of Classification Search
CPC .................. B32B 2597/00; B32B 3/30; B32B 2262/0246; B32B 2262/0261; B32B 2262/0276; B32B 5/022; B32B 2250/05; B32B 2262/0269; B32B 2262/062; B32B 2262/065; B32B 2262/101; B32B 256/04; B32B 25/10; B32B 5/024; C08K 3/04; F16G 1/10; F16G 1/28; C08F 210/06
See application file for complete search history.

(56) References Cited

U.S. PATENT DOCUMENTS

| | | | |
|---|---|---|---|
| 7,199,189 | B2 | 4/2007 | Ravishankar et al. |
| 10,899,853 | B2 | 1/2021 | Canich et al. |
| 11,053,381 | B2 | 7/2021 | Dharmarajan et al. |
| 11,390,734 | B2 | 7/2022 | Dharmarajan et al. |
| 2013/0050488 | A1 | 2/2013 | Brouard et al. |
| 2021/0047505 | A1 | 2/2021 | Loyd et al. |
| 2022/0119633 | A1 | 4/2022 | Bai et al. |

OTHER PUBLICATIONS

G. R. Hamed, "Tack and Green Strength of Elastomeric Materials", Rubber Chemistry and Technology, vol. 54, pp. 576-595 (1981).

* cited by examiner

ETHYLENE-BASED COPOLYMER AND PROPYLENE-ALPHA-OLEFIN-DIENE COMPOSITIONS FOR USE IN LAYERED ARTICLES

CROSS REFERENCE TO RELATED APPLICATIONS

This application is a U.S. national phase application of PCT Application No. PCT/US2021/041908 having a filing date of Jul. 16, 2021, which claims priority to and the benefit of U.S. Provisional Application Ser. No. 63/055,665 having a filing date of Jul. 23, 2020, the contents of both of which are incorporated by reference in their entirety.

FIELD

The present disclosure relates to elastomeric compositions comprising ethylene-based copolymers and propylene-α-olefin-diene (PEDM) terpolymers that are suitable for use in hoses, belts, and other articles.

BACKGROUND

Elastomeric polymer compounds, such as EP(D)M rubbers, are widely used in the automotive and industrial applications (e.g., brake components, under-the-hood hoses, automotive radiator coolant hoses, air conditioning hoses, steam hoses, power transmission belts, such as V-belts, flat belts, toothed or synchronous belts, multi-ribbed belts, and conveyor belts), taking advantage of their outstanding thermal and oxidative stability, and their excellent chemical resistance to polar organic and aqueous inorganic fluids.

The required performance for automotive coolant, air and heater hoses, air conditioning (A/C), and brake hose formulations include high green and tear strength, good retention of properties after aging with a balance of low temperature flexibility and compression set, and easy mixing and processing properties. Belts, like conveyor belts, have similar requirements. EP(D)M elastomers offer these properties and has been widely accepted as a reliable material of choice for a broad range of applications, such as general purpose hose, heat resistant hose, high-heat resistant hose, transmission belts, conveyor belts, and the like.

One of the challenges in processing hose and belt compounds is to have sufficient building tack, which is needed to keep the rubber layer components adhered together during processing in order to prevent deterioration before curing. That is, hoses and belts are multilayer compounds with multiple metal and rubber layers that should adhere before curing. Tackifier resins (e.g., ESCOREZ™) have been used to improve building tack, but often resulting in limited improvement, yet lower green strength and physical properties after curing.

In order to achieve a broad range of tensile strength and hardness, EP(D)M rubbers can be compounded. In addition to meeting the typical requirements for mechanical properties, such as heat resistance and compression set, the coolant hoses EP(D)M offer good low temperature sealing properties and electrochemical resistance.

Further, elastomeric hose body can include one or more elastomeric hose layers. The belt construction typically includes an elastomeric belt body, spiraled or helically wound tension cord or other textile tensile member embedded in the belt body, and often other textile reinforcements embedded in the belt body or covering one or more of the belt surfaces.

The elastomeric hose body, or the elastomeric belt body, may include one or more vulcanized rubber compositions, or an elastomeric composition, such as a thermoplastic elastomer composition. Elastomer compositions have traditionally included ethylene-propylene-(optional diene) polymers, known as EP(D)M polymers or EP(D)M rubbers. Elastomeric compositions based on EP(D)M polymers need to possess the right combination of processability and physical properties both in the vulcanized and unvulcanized state to satisfy manufacturing and end use application requirements.

Examples of properties currently lacking in vulcanized EP(D)M compositions for use of the compositions for hoses or conveyor/transmission belt applications are compression set, crosslinking density, tack and green strength, especially the balance between the two. Tack is the maximum force required to separate two identical composition samples (e.g., rubber specimens), while green strength is the tensile modulus measured at a certain extension such as 25% of a composition sample (e.g., a rubber specimen). As used herein, "green" modifies a term and means uncured.

From a manufacturing standpoint, for unvulcanized EP(D)M compositions, the uncured elastomeric sheets coming off the calendar roll should possess adequate tack to permit splicing of individual sheets to form a sheet that is several times larger than the width of the calendared sheet when it exits the roll. The unvulcanized elastomer should also have adequate green strength to be rolled onto a mandrel without sagging. However, it has been found that EP(D)M polymers have insufficient tack and perhaps green strength for use as (and manufacture of) hoses and conveyor/transmission belts.

Tack and green strength are influenced by polymer crystallinity. Lower crystallinity leads to greater tack. For example, tack of an EP(D)M composition can be modified by lowering the ethylene content of the EP(D)M polymer and, thereby, reducing crystallinity. However, lower crystallinity reduces green strength. Furthermore, lower crystallinity is detrimental to properties, such as abrasion resistance, which is also an important property for hoses and conveyor/transmission belts. Indeed, design of a single polymer (or polymer composition) that has these contrasting polymer features to meet the tack and green strength requirements presents a challenge in creating an acceptable polymer synthesis process.

Hydrocarbon tackifiers have been used as additives in EP(D)M compositions to enhance tack. However, non-hydrogenated tackifiers co-vulcanize with the EP(D)M, but do not display long-term heat resistance due, at least in part, to their unsaturation. Hydrogenated tackifiers show better thermal stability. However, they are more expensive and potentially detrimental to curing and mechanical properties due to uncrosslinking with EP(D)M. Moreover, tackifying resins directionally increase EP(D)M compound costs, when incorporated as an additive without replacing the EP(D)M polymer component.

There is a need for polymers and polymer compositions having adequate tack, green strength, compression set, tensile, and elongation for use in hoses and conveyor/transmission belts. Particularly, there is still a need to improve the properties of the hoses, such as heat resistance, compression set, extrusion, tensile, and elongation.

SUMMARY

The present disclosure relates to elastomeric compositions comprising ethylene-based copolymers and propylene- α-olefin-diene (PEDM) terpolymers for hoses, belts, and other articles comprising such blends of copolymers and terpolymers.

The present disclosure includes an elastomeric composition comprising: 5 phr to 80 phr of a PEDM terpolymer comprising 55 wt % to 95 wt % propylene, 2.5 wt % to 40 wt % α-olefin, and 0.05 wt % to 25 wt % diene, said wt % based on the weight of the PEDM terpolymer, wherein the PEDM terpolymer has Mooney viscosity (ML(1+4)) of 5 MU to 90 MU; 20 phr to 95 phr of an ethylene-based copolymer selected from the group consisting of: (a) a crystalline ethylene-based copolymer comprising 60 wt % to 95 wt % ethylene, 0 wt % to 10 wt % of one or more dienes, and 5 wt % to 40 wt % C3 to C12 α-olefin, said wt % based on the total weight of the crystalline ethylene-based copolymer, (b) an amorphous ethylene-based comprising 40 wt % to 59 wt % ethylene, 0 wt % to 10 wt % of one or more dienes, and 40 wt % to 60 wt % C3 to C12 α-olefin, said wt % based on the total weight of the amorphous ethylene-based copolymer, and (c) a combination of (a) and (b); and 10 phr to 200 phr of a process oil.

The present disclosure also includes a hose comprising: an inner rubber tubular; a reinforcing fabric around the inner rubber tubular; and a rubber layer around the reinforcing fabric; wherein the inner rubber tubular and/or the rubber layer comprise an elastomeric composition comprising: 5 phr to 80 phr of a PEDM terpolymer comprising 55 wt % to 95 wt % propylene, 2.5 wt % to 40 wt % α-olefin, and 0.05 wt % to 25 wt % diene, said wt % based on the weight of the PEDM terpolymer, wherein the PEDM terpolymer has Mooney viscosity (ML(1+4)) of 5 MU to 90 MU; 20 phr to 95 phr of an ethylene-based copolymer selected from the group consisting of: (a) a crystalline ethylene-based copolymer comprising 60 wt % to 95 wt % ethylene, 0 wt % to 10 wt % of one or more dienes, and 5 wt % to 40 wt % C3 to C12 α-olefin, said wt % based on the total weight of the crystalline ethylene-based copolymer, (b) an amorphous ethylene-based comprising 40 wt % to 59 wt % ethylene, 0 wt % to 10 wt % of one or more dienes, and 40 wt % to 60 wt % C3 to C12 α-olefin, said wt % based on the total weight of the amorphous ethylene-based copolymer, and (c) a combination of (a) and (b); and 10 phr to 200 phr of a process oil.

The present disclosure also includes a hose comprising: an inner rubber tubular; a reinforcing fabric around the inner rubber tubular; and a rubber layer around the reinforcing fabric; wherein the inner rubber tubular and/or the rubber layer comprise an elastomeric composition comprising: 5 phr to 50 phr of a PEDM, wherein the PEDM terpolymer has Mooney viscosity (ML(1+4)) of 5 MU to 90 MU; 50 phr to 95 phr of an ethylene-based copolymer selected from the group consisting of: (a) a crystalline ethylene-based copolymer comprising 60 wt % to 95 wt % ethylene, 0 wt % to 10 wt % of one or more dienes, and 5 wt % to 40 wt % C3 to C12 α-olefin, said wt % based on the total weight of the crystalline ethylene-based copolymer, (b) an amorphous ethylene-based comprising 40 wt % to 59 wt % ethylene, 0 wt % to 10 wt % of one or more dienes, and 40 wt % to 60 wt % C3 to C12 α-olefin, said wt % based on the total weight of the amorphous ethylene-based copolymer, and (c) a combination of (a) and (b); and 10 phr to 200 phr of a process oil.

The present disclosure also includes a belt comprising: a first outer rubber layer; a second outer rubber layer; and a reinforcing fabric between the first and second outer rubber layers; wherein the first outer rubber layer and/or the second outer rubber layer comprise an elastomeric composition comprising: 5 phr to 80 phr of a PEDM terpolymer comprising 55 wt % to 95 wt % propylene, 2.5 wt % to 40 wt % α-olefin, and 0.05 wt % to 25 wt % diene, said wt % based on the weight of the PEDM terpolymer, wherein the PEDM terpolymer has Mooney viscosity (ML(1+4)) of 5 MU to 90 MU; 20 phr to 95 phr of an ethylene-based copolymer selected from the group consisting of: (a) a crystalline ethylene-based copolymer comprising 60 wt % to 95 wt % ethylene, 0 wt % to 10 wt % of one or more dienes, and 5 wt % to 40 wt % C3 to C12 α-olefin, said wt % based on the total weight of the crystalline ethylene-based copolymer, (b) an amorphous ethylene-based comprising 40 wt % to 59 wt % ethylene, 0 wt % to 10 wt % of one or more dienes, and 40 wt % to 60 wt % C3 to C12 α-olefin, said wt % based on the total weight of the amorphous ethylene-based copolymer, and (c) a combination of (a) and (b); and 10 phr to 200 phr of a process oil.

The present disclosure also includes a belt comprising: a first outer rubber layer; a second outer rubber layer; and a reinforcing fabric between the first and second outer rubber layers; wherein the first outer rubber layer and/or the second outer rubber layer comprise an elastomeric composition comprising: 5 phr to 80 phr of a PEDM terpolymer, wherein the PEDM terpolymer has Mooney viscosity (ML(1+4)) of 5 MU to 90 MU; 20 phr to 95 phr of a crystalline ethylene-based copolymer comprising 60 wt % to 95 wt % ethylene, 0 wt % to 10 wt % of one or more dienes, and 5 wt % to 40 wt % C3 to C12 α-olefin, said wt % based on the total weight of the crystalline ethylene-based copolymer; 0 phr to 75 phr of an amorphous ethylene-based copolymer comprising 40 wt % to 59 wt % ethylene, 0 wt % to 10 wt % of one or more dienes, and 40 wt % to 60 wt % C3 to C12 α-olefin, said wt % based on the total weight of the amorphous ethylene-based copolymer; and 10 phr to 30 phr of a process oil.

The present disclosure also includes a belt comprising: a first outer rubber layer; a second outer rubber layer; and alternating layers of rubber skim layers and reinforcing fabrics between the first and second outer rubber layers; wherein the first outer rubber layer and/or the second outer rubber layer and/or the rubber skim layers comprise an elastomeric composition comprising: 5 phr to 80 phr of a PEDM terpolymer, wherein the PEDM terpolymer has Mooney viscosity (ML(1+4)) of 5 MU to 90 MU; 20 phr to 95 phr of a crystalline ethylene-based copolymer comprising 60 wt % to 95 wt % ethylene, 0 wt % to 10 wt % of one or more dienes, and 5 wt % to 40 wt % C3 to C12 α-olefin, said wt % based on the total weight of the crystalline ethylene-based copolymer; 0 phr to 75 phr of an amorphous ethylene-based copolymer comprising 40 wt % to 59 wt % ethylene, 0 wt % to 10 wt % of one or more dienes, and 40 wt % to 60 wt % C3 to C12 α-olefin, said wt % based on the total weight of the amorphous ethylene-based copolymer; and 10 phr to 30 phr of a process oil.

BRIEF DESCRIPTION OF THE FIGURES

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
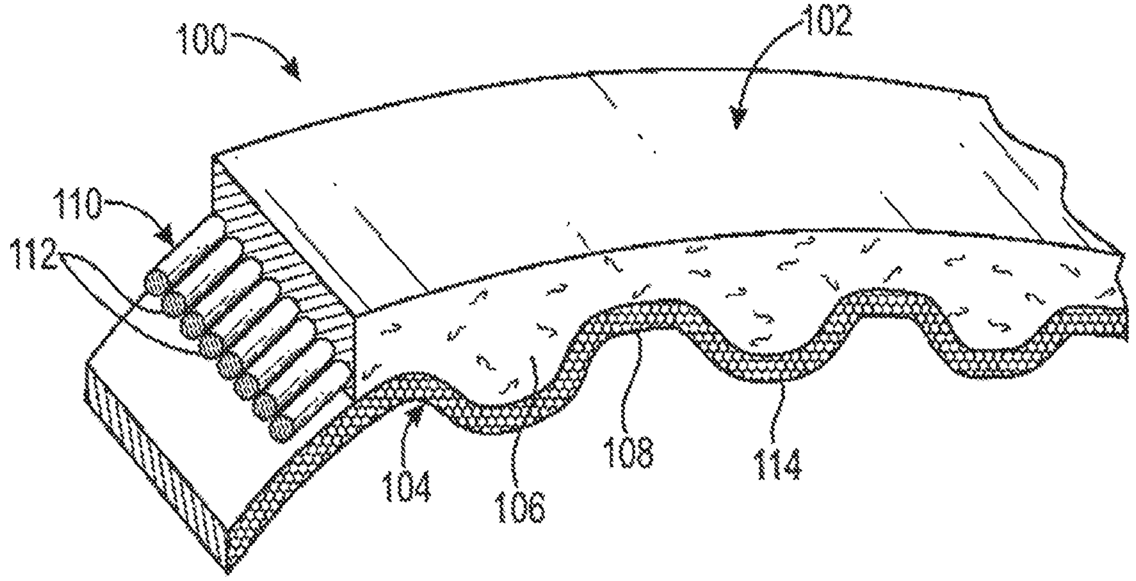
FIG. 1 is a fragmented perspective view of a transmission belt in accordance with some embodiments of the present disclosure.

Embodiments of the present disclosure include elastomeric compositions (e.g., for belts and/or hoses) comprising a PEDM terpolymer (e.g., from 5 phr to 80 phr of a composition), an ethylene-based copolymer (e.g., from 20 phr to 95 phr), and a process oil (e.g., from 10 phr to 200 phr). The ethylene-based copolymer may be a crystalline ethylene-based copolymer, an amorphous ethylene-based copolymer, or a combination thereof. Advantageously, such compositions provide improved green tack, tack after aging, green strength, compression set, tensile, and elongation. Because of these improved properties, the compositions described herein may be useful in producing higher quality automotive and industrial hoses and belts (e.g., power transmission belts and conveyor belts). Further, the elastomeric compositions described herein may be more easily extruded, which can further improve the physical properties of the resultant hoses and belts because fewer faults, bubbles, and voids are present.

For example, a preferred elastomeric composition for use in a belt (e.g., a conveyor belt, a transmission belt, or the like) may comprise 5 phr to 80 phr of a propylene-α-olefin-diene (PEDM) terpolymer comprising 55 wt % to 95 wt % propylene, 2.5 wt % to 40 wt % α-olefin, and 0.05 wt % to 25 wt % diene, said wt % based on the weight of the PEDM terpolymer, wherein the PEDM terpolymer has a Mooney viscosity (ML(1+4)) at 125° C. of 5 MU to 90 MU; 20 phr to 95 phr of a crystalline ethylene-based copolymer comprising 60 wt % to 95 wt % ethylene, 0 wt % to 10 wt % of one or more dienes, and 5 wt % to 40 wt % C3 to C12 α-olefin, said wt % based on the total weight of the crystalline ethylene-based copolymer; 0 phr to 75 phr of an amorphous ethylene-based copolymer comprising 40 wt % to 59 wt % ethylene, 0 wt % to 10 wt % of one or more dienes, and 40 wt % to 60 wt % C3 to C12 α-olefin, said wt % based on the total weight of the amorphous ethylene-based copolymer; and 10 phr to 30 phr of a process oil.

In another example, a preferred elastomeric composition for use in a hose may comprise 5 phr to 50 phr of a propylene-α-olefin-diene (PEDM) terpolymer comprising 55 wt % to 95 wt % propylene, 2.5 wt % to 40 wt % α-olefin, and 0.05 wt % to 25 wt % diene, said wt % based on the weight of the PEDM terpolymer, wherein the PEDM terpolymer has Mooney viscosity (ML(1+4)) of 5 MU to 90 MU; 50 phr to 95 phr of an ethylene-based copolymer selected from the group consisting of: (a) a crystalline ethylene-based copolymer comprising 60 wt % to 95 wt % ethylene, 0 wt % to 10 wt % of one or more dienes, and 5 wt % to 40 wt % C3 to C12 α-olefin, said wt % based on the total weight of the crystalline ethylene-based copolymer, (b) an amorphous ethylene-based comprising 40 wt % to 59 wt % ethylene, 0 wt % to 10 wt % of one or more dienes, and 40 wt % to 60 wt % C3 to C12 α-olefin, said wt % based on the total weight of the amorphous ethylene-based copolymer, and (c) a combination of (a) and (b); and 10 phr to 200 phr of a process oil.

Definitions

As used herein, the term "copolymer" is meant to include polymers having two or more monomers. The term "polymer," as used herein, includes, but is not limited to, homopolymers, copolymers, terpolymers, etc., and alloys and blends thereof. The term "terpolymer," as used herein, refers to a polymer synthesized from three different monomers. Terpolymers, in some embodiments, may be produced (1) by mixing all three monomers at the same time or (2) by sequential introduction of the different comonomers. The mixing of comonomers may be done in one, two, or possibly three different reactors in series and/or in parallel. The term "polymer," as used herein, also includes impact, block, graft, random, and alternating, and gradient copolymers. The term "polymer" shall further include all possible geometrical configurations, unless otherwise specifically stated. Such configurations may include isotactic, syndiotactic and random (i.e., atactic) symmetries.

The term "blend," as used herein, refers to a mixture of two or more polymers. Blends may be produced by, for example, solution blending, melt mixing, or compounding in a shear mixer. Solution blending is common for making adhesive formulations comprising baled butyl rubber, tackifier, and oil. Then, the solution blend is coated on a fabric substrate, and the solvent evaporated to leave the adhesive.

The term "monomer" or "comonomer," as used herein, can refer to the monomer used to form the polymer (i.e., the unreacted chemical compound in the form prior to polymerization) and can also refer to the monomer after it has been incorporated into the polymer, also referred to herein as a "[monomer]-derived unit." Different monomers are discussed herein, including propylene monomers, ethylene monomers, and diene monomers.

As used herein, the term "ethylene-based copolymer" includes copolymers derived from ethylene, an α-olefin having 3 or more carbon atoms (e.g., 3-12 carbon atoms or 6-10 carbon atoms), and optionally a diene. In preferred embodiments, the ethylene-based copolymer is an ethylene-propylene copolymer or ethylene-propylene-diene polymer.

As used herein, an "ethylene-propylene-diene polymer" (EP(D)M) is defined to be a copolymer having an ethylene content (derived from ethylene monomers) and a propylene content (derived from propylene monomers), and optionally a diene content (derived from diene monomers, preferably non-conjugated diene monomers). The ethylene content can be from 40 wt % to 95 wt % (e.g., from 41 wt % to 95 wt %, such as from 45 wt % to 90 wt %, such as from 50 wt % to 80 wt %), the diene content is from 0 wt % to 10 wt %, and the balance (i.e., the remaining wt % of the polymer) is primarily (e.g., allowing for minor impurities) or entirely propylene content, based on the weight of the polymer. An EP(D)M may have a Mooney viscosity, (ML, 1+4 @ 125° C.) (measured according to ASTM D1646-17) of from 15 to 100. The terms "EP(D)M" and "EPDM" are used interchangeably and have the same meaning, unless specified otherwise in context (e.g., where the polymer is referred to as definitively comprising diene monomer(s)).

The term "propylene-α-olefin-diene terpolymer," as used herein, includes a polymer derived from propylene, an α-olefin (preferably ethylene), and diene monomers. Propylene-α-olefin-diene terpolymers may be referred to by the shorthand PEDM, even though α-olefins instead of, or in addition to, ethylene are contemplated as comonomers in such terpolymers, and/or polyenes instead of, or in addition to, dienes are contemplated.

As used herein, "phr" means "parts per hundred parts rubber," where the "rubber" is the total rubber content of the composition. Herein, both PEDM and ethylene-based copolymer (e.g., EP(D)M) are considered to contribute to the total rubber content, such that in compositions where both are present, the "total rubber" is the combined weight of PEDM and ethylene-based copolymer. Thus, for example, a composition having 30 parts by weight of PEDM and 70 parts by weight of ethylene-based copolymer may be referred to as having 30 phr PEDM and 70 phr ethylene-based copolymer. Other components added to the composition are calculated on a phr basis. For example, addition of 50 phr of oil to a composition means that 50 g of oil are present in the composition for every 100 g of PEDM and ethylene-based copolymer combined. Unless specified otherwise, phr should be taken as phr on a weight basis.

As used herein, "tensile strength" means the amount of stress applied to a sample to break the sample. It can be expressed in Pascals or pounds per square inch (psi). ASTM D412-16 can be used to determine tensile strength of a polymer.

"Mooney viscosity," as used herein, is the Mooney viscosity of a polymer or polymer composition. The polymer composition analyzed for determining Mooney viscosity should be substantially devoid of solvent. For instance, the sample may be placed on a boiling-water steam table in a hood to evaporate a large fraction of the solvent and unreacted monomers and, then, dried in a vacuum oven overnight (12 hours, 90° C.) prior to testing in accordance with laboratory analysis techniques, or the sample for testing may be taken from a devolatilized polymer (i.e., the polymer post-devolatilization in industrial-scale processes). Unless otherwise indicated, Mooney viscosity is measured using a Mooney viscometer according to ASTM D1646-17, but with the following modifications/clarifications of that procedure. First, sample polymer is pressed between two hot plates of a compression press prior to testing. The plate temperature is 125° C.+/−10° C. instead of the 50° C.+/−5° C. recommended in ASTM D1646-17, because 50° C. is unable to cause sufficient massing. Further, although ASTM D1646-17 allows for several options for die protection, should any two options provide conflicting results, PET 36 micron should be used as the die protection. Further, ASTM D1646-17 does not indicate a sample weight in Section 8; thus, to the extent results may vary based upon sample weight, Mooney viscosity determined using a sample weight of 21.5 g+/−2.7 g in the D1646-17 Section 8 procedures will govern. Finally, the rest procedures before testing set forth in D1646-17 Section 8 are 23° C.+/−3° C. for 30 min in air; Mooney values, as reported herein, were determined after resting at 24° C.+/−3° C. for 30 min in air. Samples are placed on either side of a rotor according to the ASTM D1646-17 test method; torque required to turn the viscometer motor at 2 rpm is measured by a transducer for determining the Mooney viscosity. The results are reported as Mooney Units (ML, 1+4 @ 125° C.), where M is the Mooney viscosity number, L denotes large rotor (defined as ML in ASTM D1646-17), 1 is the pre-heat time in minutes, 4 is the sample run time in minutes after the motor starts, and 125° C. is the test temperature. Thus, a Mooney viscosity of 90 determined by the aforementioned method would be reported as a Mooney viscosity of 90 MU (ML, 1+4 @ 125° C.). Alternatively, the Mooney viscosity may be reported as 90 MU; in such instance, it should be assumed that the just-described method is used to determine such viscosity, unless otherwise noted. In some instances, a lower test temperature may be used (e.g., 100° C.), in which case Mooney is reported as Mooney Viscosity (ML, 1+4 @ 100° C.), or @ T° C. where T is the test temperature.

Numerical ranges used herein include the numbers recited in the range. For example, the numerical range "from 1 wt % to 10 wt %" includes 1 wt % and 10 wt % within the recited range.

Room temperature is 23° C., unless otherwise indicated.

Elastomeric Compositions

Elastomeric compositions described herein comprise: 5 to 80 parts by weight phr of a PEDM terpolymer comprising 55 wt % to 95 wt % propylene, 2.5 wt % to 40 wt % α-olefin, and 0.05 wt % to 25 wt % diene, said wt % based on the weight of the PEDM terpolymer, wherein the PEDM terpolymer has a Mooney viscosity (ML(1+4)) of 5 MU to 90 MU; 20 phr to 95 phr of an ethylene-based copolymer; and 10 phr to 200 phr of a process oil. The ethylene-based copolymer may be: (a) a crystalline ethylene-based copolymer comprising 60 wt % to 95 wt % ethylene, 0 wt % to 10 wt % of one or more dienes, and 5 wt % to 40 wt % C3 to C12 α-olefin, said wt % based on the total weight of the crystalline ethylene-based copolymer and (b) an amorphous ethylene-based copolymer comprising 40 wt % to 59 wt % ethylene, 0 wt % to 10 wt % of one or more dienes, and 40 wt % to 60 wt % C3 to C12 α-olefin, said wt % based on the total weight of the amorphous ethylene-based copolymer. Herein, the rubber portion (from which phr is derived) is cumulatively the PEDM terpolymer, the crystalline ethylene-based copolymer, and the amorphous ethylene-based copolymer.

The PEDM may be present in the elastomeric compositions from 5 phr to 80 phr, or from 5 phr to 40 phr, or from 10 phr to 30 phr, or from 20 phr to 50 phr, or from 30 phr to 70 phr, or from 40 phr to 80 phr, or from 45 phr to 80 phr, or from 50 phr to 80 phr. For example, in belt compositions, the PEDM may be present in the elastomeric compositions from 5 phr to 80 phr, or from 5 phr to 40 phr, or from 10 phr to 30 phr, or from 20 phr to 50 phr, or from 30 phr to 70 phr, or from 40 phr to 80 phr, or from 45 phr to 80 phr, or from 50 phr to 80 phr. In hose compositions, PEDM may be present in the elastomeric compositions from 5 phr to 50 phr, or from 5 phr to 20 phr, or from 10 phr to 30 phr, or from 20 phr to 50 phr. The PEDM composition is described further below.

The ethylene-based copolymer (crystalline, amorphous, or a mixture thereof) may be present in the elastomeric compositions from 20 phr to 95 phr, or from 60 phr to 95 phr, or from 70 phr to 90 phr, or from 50 phr to 80 phr, or from 30 phr to 70 phr, or from 20 phr to 60 phr, or from 20 phr to 55 phr, or from 20 phr to 50 phr. The crystalline ethylene-based copolymer composition and amorphous ethylene-based copolymer composition are described further below.

For example, in belt compositions, the ethylene-based copolymer may be a crystalline ethylene-based copolymer or a mixture of a crystalline ethylene-based copolymer and an amorphous ethylene-based copolymer. In belt compositions, the crystalline ethylene-based copolymer may be present in the elastomeric compositions from 20 phr to 95 phr, or from 60 phr to 95 phr, or from 70 phr to 90 phr, or from 50 phr to 80 phr, or from 30 phr to 70 phr, or from 20 phr to 60 phr, or from 20 phr to 55 phr, or from 20 phr to 50 phr, and the amorphous ethylene-based copolymer may be present in the elastomerics composition from 0 phr to 75 phr, or at 0 phr (i.e., not present), or from 1 phr to 10 phr, or from 5 phr to 25 phr, or from 20 phr to 50 phr, or from 30 phr to 65 phr, or from 50 phr to 75 phr.

For example, in hose compositions, the ethylene-based copolymer may be a crystalline ethylene-based copolymer, an amorphous ethylene-based copolymer, or a mixture of a crystalline ethylene-based copolymer and an amorphous ethylene-based copolymer. In hose compositions, the ethylene-based copolymer crystalline, amorphous, or a mixture thereof) may be present in the elastomeric compositions from 50 phr to 95 phr, or from 50 phr to 75 phr, or from 60 phr to 90 phr, or from 75 phr to 95 phr. In hose compositions, the crystalline ethylene-based copolymer may be present in the elastomeric compositions from 0 phr to 75 phr, or at 0 phr (i.e., not present), or from 1 phr to 10 phr, or from 5 phr to 25 phr, or from 20 phr to 50 phr, or from 40 phr to 75 phr, or from 70 phr to 95 phr, and the amorphous ethylene-based copolymer may be present in the elastomeric compositions from 0 phr to 75 phr, or at 0 phr (i.e., not present), or from 1 phr to 10 phr, or from 5 phr to 25 phr, or from 20 phr to 50 phr, or from 40 phr to 75 phr, or from 70 phr to 95 phr.

The process oil may be present in the elastomeric compositions from 10 phr to 200 phr, or from 10 phr to 30 phr, or from 30 phr to 75 phr, or from 50 phr to 100 phr, or from 75 phr to 150 phr, or from 100 phr to 200 phr. Depending on the end-use application or product, the amount of process oil in the elastomeric compositions may vary. For example, when the end-use application or product is a belt (e.g., a transmission belt or a conveyor belt), the process oil may preferably be present in the elastomeric compositions from 10 phr to 30 phr, or from 10 phr to 15 phr, or from 10 phr to 20 phr, or from 15 phr to 30 phr. In another example, when the end-use application or product is a hose (e.g., an automotive hose), the process oil may preferably be present in the elastomeric compositions from 10 phr to 200 phr, or from 10 phr to 30 phr, or from 30 phr to 75 phr, or from 50 phr to 100 phr, or from 75 phr to 150 phr, or from 100 phr to 200 phr.

Process oil, such as paraffinic and/or isoparaffinic process oil (examples including SUNPAR™ 2280 (available from HollyFrontier Refining & Marketing LLC); as well as IPOL™2300 (available from GP Petroleum Limited); and FLEXON™ 876, CORE™ 600 base stock oil, FLEXON™ 815, and CORE™ 2500 base stock oil (each available from ExxonMobil Chemical Company)). Particularly in embodiments where color of the end product may be important, a white oil (e.g., API Group II or API Group III base oil) may be used as process oil. Examples include paraffinic and/or isoparaffinic oils with low (under 1 wt %, such as under 0.1 wt %) aromatic and heteroatom content. Compositions of the present disclosure may comprise process oil from 1 phr to 150 phr, such as from 50 phr to 100 phr, such as from 60 phr to 80 phr, or, for sponge grades, from 50 phr to 200 phr, such as from 70 phr to 150 phr, such as from 80 phr to 100 phr, and preferred process oils have viscosity at 40° C. from 80 CSt to 600 CSt.

The elastomeric compositions described herein may also include additives that may include, but are not limited to, curatives, crosslinking agents, fillers, plasticizers, compatibilizers, crosslinkers, and the like, and any combination thereof. The additives are described further below.

PEDM Terpolymers

PEDM terpolymers of the present disclosure have from 0.005 wt % to 25 wt % polyene (preferably diene) content, 2.5 wt % to 40 wt % C2 or C4 to C12 α-olefin (preferably ethylene) content, and 55 wt % to 95 wt % propylene content, said wt % based on the weight of the PEDM terpolymer.

Compositions described herein can comprise a single PEDM terpolymer or a mixture of two or more PEDM terpolymers (e.g., a dual reactor product).

PEDM terpolymers of the present disclosure comprise from 50 wt % to 97 wt % propylene, based on the weight of the PEDM terpolymer. Other preferred ranges of propylene content include from 55 wt % to 95 wt %, such as from 65 wt % to 95 wt %, such as from 75 wt % to 95 wt %, such as from 85 wt % to 95 wt %, based on the weight of the PEDM terpolymer.

PEDM terpolymers of the present disclosure comprise from 2.5 wt % to 40 wt % C2 or C4 to C12 α-olefin comonomer (preferably ethylene), based on the weight of the PEDM terpolymer. Other preferred ranges of α-olefin (e.g., ethylene) content include from 2.5 wt % to 30 wt %, such as from 2.5 wt % to 20 wt %, such as from 2.5 wt % to 15 wt %, such as from 2.5 wt % to 10 wt %, alternately from 10 wt % to 30 wt %, such as from 15 wt % to 25 wt %, based on the weight of the PEDM terpolymer. C2 or C4 to C12 α-olefin comonomers include, but are not limited to, ethylene, butylene, pentylene, hexylene, heptylene, octylene, nonylene, decylene, undecylene, dodecylene, and branched isomers thereof. Ethylene is particularly preferred.

PEDM terpolymers of the present disclosure comprise a polyene content (preferably diene content) of from 0.005 wt % to 25 wt %, such as from 0.5 wt % to 20 wt %, such as from 1 wt % to 15 wt %, such as from 1.5 wt % to 10 wt %, such as from 2.5 wt % to 7.5 wt %, based on the weight of the PEDM terpolymer. In at least one embodiment, the diene is 5-ethylidene-2-norbornene content in an amount of from 0.005 wt % to 25 wt %, such as from 0.5 wt % to 20 wt %, such as from 1 wt % to 15 wt %, such as from 1.5 wt % to 10 wt %, such as from 2.5 wt % to 7.5 wt %, based on the weight of the PEDM terpolymer. The polyenes, as noted, are preferably (but not necessarily) dienes. Suitable dienes may be conjugated or non-conjugated. Preferably, the dienes are non-conjugated. Dienes include, but are not limited to, 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD); and combinations thereof. Preferably, the diene is ENB or VNB.

Molecular weights (number average molecular weight (Mn), weight average molecular weight (Mw), and z-average molecular weight (Mz)) can be determined using a Polymer Laboratories Model 220 high temperature gel-permeation chromatography size-exclusion chromatography (GPC-SEC) equipped with on-line differential refractive index (DRI), light scattering (LS), and viscometer (VIS) detectors. Three Polymer Laboratories PLgel 10 m Mixed-B columns are used for separation using a flow rate of 0.54 ml/min and a nominal injection volume of 300 μL. The detectors and columns are contained in an oven maintained at 135° C. The stream emerging from the SEC columns is directed into the miniDAWN (Wyatt Technology, Inc.) optical flow cell and then into the DRI detector. The viscometer is inside the SEC oven, positioned after the DRI detector. The details of these detectors as well as their calibrations are described by, for example, T. Sun, P. Brant, R. R. Chance, and W. W. Graessley, Macromolecules, vol. 34(19), pp. 6812-6820, (2001).

Solvent for the SEC experiment can be prepared by dissolving 6 grams of butylated hydroxy toluene (BHT) as an antioxidant in 4 liters of Aldrich reagent grade 1,2,4-trichlorobenzene (TCB). The TCB mixture is then filtered through a 0.7 micrometer glass pre-filter and subsequently through a 0.1 micrometer Teflon filter. The TCB is then degas sed with an online degas ser before entering the SEC. Polymer solutions are prepared by placing dry polymer in a glass container, adding the desired amount of BHT stabilized TCB, then heating the mixture at 160° C. with continuous agitation for about 2 hours. All quantities are measured gravimetrically. The TCB densities used to express the polymer concentration in mass/volume units can be 1.463 g/mL at 22° C. and 1.324 g/mL at 135° C. The injection concentration can be from 1 mg/mL to 2 mg/mL, with lower concentrations being used for higher molecular weight samples. Prior to running each sample the DRI detector and the injector should be purged. Flow rate in the apparatus can then be increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c=K_{DRI}I_{DRI}/(dn/dc)$$

where $K_{DRI}$ is a constant determined by calibrating the DRI with a series of mono-dispersed polystyrene standards with molecular weight ranging from 600 to 10M, and (dn/dc) is the refractive index increment for the system. The refractive index, n=1.500 for TCB at 145° C. and λ=690 nm. For purposes of the present disclosure and the claims thereto (dn/dc)=0.1048 for ethylene-propylene copolymers, and (dn/dc)=0.1048-0.0016ENB for EPDM comprising ENB as the diene, where ENB is the ENB content in wt % in the ethylene-propylene-diene terpolymer. Where other non-conjugated polyenes are used instead of (or in addition to) ENB, the ENB is taken as weight percent of total non-conjugated polyenes. The value (dn/dc) is otherwise taken as 0.1 for other polymers and copolymers, including PEDM terpolymers. Units of parameters used throughout this description of the SEC method are: concentration is expressed in g/cm$^3$, molecular weight is expressed in g/mol, and intrinsic viscosity is expressed in dL/g.

The light scattering (LS) detector can be, for example, a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, ΔR(θ) is the measured excess Rayleigh scattering intensity at scattering angle θ, c is the polymer concentration determined from the DRI analysis, $A_2$ is the second virial coefficient (for purposes of the present disclosure, $A_2$=0.0015 for ethylene homopolymer and $A_2$=0.0015−0.00001EE for ethylene-propylene copolymers, where EE is the ethylene content in weight percent in the ethylene-propylene copolymer. P(θ) is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=690 nm.

PEDM terpolymers of the present disclosure may have an Mw of from 120,000 g/mol to 320,000 g/mol, such as from 120,000 g/mol to 200,000 g/mol, such as from 175,000 g/mol to 250,000 g/mol, such as from 225,000 g/mol to 320,000 g/mol. The PEDM terpolymer may have an Mn of from 50,000 g/mol to 150,000 g/mol, such as from 50,000 g/mol to 100,000 g/mol, such as from 75,000 g/mol to 125,000 g/mol, such as from 100,000 g/mol to 150,000 g/mol. The PEDM terpolymer may have an Mz of from 175,000 g/mol to 500,000 g/mol, such as from 175,000 g/mol to 250,000 g/mol, such as from 225,000 g/mol to 350,000 g/mol, such as from 350,000 g/mol to 500,000 g/mol. For purposes of this application, where DRI and LS measurements conflict, LS measurements should be used for Mw and Mz, while DRI measurements should be used for Mn.

The polydispersity index (Mw/Mn) of PEDM terpolymers of the present disclosure may be from 2.0 to 2.7, such as from 2.0 to 2.5, or from 2.4 to 2.7.

In at least one embodiment, the PEDM terpolymer has a Mn of 50,000 g/mol to 150,000 g/mol; a Mw of 120,000 g/mol to 320,000 g/mol; and a polydispersity index of 2.0 to 2.7.

PEDM terpolymers of the present disclosure may have a density of from 0.75 g/cm$^3$ to 0.95 g/cm$^3$, such as from 0.80 g/cm$^3$ to 0.92 g/cm$^3$, such as from 0.85 g/cm$^3$ to 0.90 g/cm$^3$, at room temperature as measured per the ASTM D1505-10 test method.

PEDM terpolymers of the present disclosure may have a melt flow rate (MFR, 2.16 kg weight at 230° C.), equal to or greater than 0.5 g/10 min as measured according to the ASTM D1238-13. For example, the MFR (2.16 kg at 230° C.) for the PEDM terpolymers of the present disclosure may be from 0.5 g/10 min to 15 g/10 min, such as from 1 g/10 min to 12.5 g/10 min, such as from 1.5 g/10 min to 10 g/10 min, such as from 2.5 g/10 min to 8 g/10 min, or from 5 g/10 min to 7.5 g/10 min.

PEDM terpolymers of the present disclosure may have a Mooney viscosity (ML, 1+4 @ 125° C.) of 5 MU to 90 MU, or 5 MU to 25 MU, or 20 MU to 50 MU, or 40 MU to 60 MU, or 50 MU to 80 MU, or 60 MU to 90 MU.

Differential Scanning calorimetry (DSC) was used to determine Tg of the α-olefin-ethylene-diene polymer according to ASTM D3418-03. Melting temperature (Tm) and heat of fusion (Hf) are also determined by DSC. DSC data can be obtained using a TA Instruments model Q200 machine. Samples weighing approximately from 5 mg to 10 mg can be kept in an aluminum sample pan and hermetically sealed. The samples can be gradually heated to 200° C. at a rate of 10° C./minute and, thereafter, held at 200° C. for 2 minutes. The samples can be subsequently cooled to −90° C. at a rate of 10° C./minute and held isothermally for 2 minutes at −90° C. This can be followed by a second heating cycle wherein the samples can be heated to 200° C. at 10° C./minute. Both the first and second cycle thermal events can be recorded.

During the second heating cycle, appearance of melting indicates crystallinity and thus measured heat of fusion is used to compute the crystallinity. The thermal output, recorded as the area under the melting peak of the sample, is a measure of the heat of fusion and may be expressed in Joules per gram of polymer. The melting point is recorded as the temperature of the greatest heat absorption within the range of melting of the sample relative to a baseline measurement for the increasing heat capacity of the polymer as a function of temperature.

PEDM terpolymers of the present disclosure can have a heat of fusion ($H_f$) of less than 1 J/g. Additionally or alternatively, PEDM terpolymers of the present disclosure can have a heat of fusion ($H_f$) of less than 15 J/g. Additionally or alternatively, PEDM terpolymers of the present disclosure can have a heat of fusion ($H_f$) of 15 J/g or greater. In at least one embodiment, PEDM terpolymers are amorphous. Additionally or alternatively, PEDM terpolymers can have atactic propylene sequences. In at least one embodiment, a PEDM terpolymer has a glass transition temperature (Tg) from −45° C. to −2° C., or from −35° C. to −30° C. In at least one embodiment, the PEDM terpolymers can have a $H_f$ of less than 1 J/g and syndiotactic r diads where the percentage of r diads is low enough to still be substantially amorphous (i.e., have the low $H_f$).

PEDM terpolymers of the present disclosure may have atactic polypropylene sequences. Also or instead, PEDM terpolymers of the present disclosure may be amorphous, meaning the PEDM terpolymers will exhibit no melting peak when subjected to differential scanning calorimetry (DSC) testing. Alternatively, PEDM according to some embodiments may exhibit minor melting peak, such that they may be observed to have $H_f$<1 J/g according to the DSC methodology described herein. Further, where a PEDM exhibits any melting peak, such peak may be a single peak, or the PEDM may show secondary melting peaks adjacent to the principal peak. For purposes herein, such secondary melting peaks are considered together as a single melting point, with the highest of these peaks (relative to baseline as described herein) being considered as the melting point of the PEDM terpolymer.

According to yet further embodiments, the crystallinity of PEDM terpolymers may be expressed in terms of percentage of crystallinity (i.e., % crystallinity), as determined according to the DSC procedure described herein. Although PEDM according to certain embodiments is amorphous (and may therefore be said to have 0% crystallinity), if a PEDM according to various other embodiments exhibits any crystallinity, it preferably has a % crystallinity of from 0.1% to 5%, preferably 0.1% to 3%. (The degree of crystallinity is determined by dividing (i) heat of fusion measured by (ii) the heat of fusion for 100% crystalline polyethylene, which has the value of 293 J/g (B. Wunderlich, Thermal Analysis, Academic Press, 1990, pp. 417-431).)

The percent crystallinity is calculated using the formula: [area under the curve (in J/g)/H° (in J/g)]*100, where H° is the ideal heat of fusion for a perfect crystal of the homopolymer of the major monomer component. These values for H° are to be obtained from the Polymer Handbook, Fourth Edition, published by John Wiley and Sons, New York 1999, except that a value of 290 J/g is used for H° (polyethylene), a value of 140 J/g is used for H° (polybutene), and a value of 207 J/g is used for H° (polypropylene).

Further, as mentioned above, where the sample exhibits no melting peak, as in the case of amorphous polymers, it may be said to have no $H_f$. However, even some amorphous or near-amorphous PEDM samples might exhibit a minor melting peak, e.g., such that $H_f$ on the first melt may be observed as <1 J/g. Therefore, for purposes of the present application, a PEDM may be considered amorphous when it has $H_f$<1 J/g, or alternatively when it exhibits no discernable melting peak.

Ethylene-Based Copolymers

Compositions of the present disclosure comprise an ethylene-based copolymer. The ethylene-based copolymer may be one or more crystalline ethylene-based copolymers, one or more amorphous ethylene-based copolymers, or a combination of one or more crystalline ethylene-based copolymers and one or more amorphous ethylene-based copolymers.

Unless otherwise specified, the term "ethylene-based copolymer" can be a crystalline ethylene-based copolymers, an amorphous ethylene-based copolymers, or both the crystalline ethylene-based copolymers and the amorphous ethylene-based copolymers. As described below, crystalline versus amorphous is based on the heat of fusion (Hf) of the ethylene-based copolymer, which is, at least in part, dependent on the ethylene content in the ethylene-based copolymer.

A crystalline ethylene-based copolymer may have an ethylene content from 60 wt % to 95 wt %, or from 60 wt % to 80 wt %, or from 75 wt % to 95 wt %, based on the weight of the crystalline ethylene-based copolymer. An amorphous ethylene-based copolymer may have an ethylene content from 40 wt % to 59 wt %, or from 40 wt % to 55 wt %, or from 45 wt % to 59 wt %, based on the weight of the amorphous ethylene-based copolymer.

The balance of the composition of the crystalline ethylene-based copolymer and the amorphous ethylene-based copolymer is a C3 to C12 α-olefin and, optionally, a polyene (preferably diene).

Accordingly, a crystalline ethylene-based copolymer may have an ethylene content from 60 wt % to 95 wt % (or from 60 wt % to 80 wt %, or from 75 wt % to 95 wt %); a C3 to C12 α-olefin content of 5 wt % to 40 wt % (or from 5 wt % to 25 wt %, or from 20 wt % to 40 wt %); and a diene content of 0 wt % to 10 wt % (or from 0 wt % to 5 wt %, or from 1 wt % to 5 wt %, or from 5 wt % to 10 wt %). Further, an amorphous ethylene-based copolymer may have an ethylene content from 40 wt % to 60 wt % (or from 40 wt % to 55 wt %, or from 45 wt % to 60 wt %); a C3 to C12 α-olefin content of 40 wt % to 60 wt % (or from 45 wt % to 60 wt %, or from 40 wt % to 55 wt %); and a diene content of 0 wt % to 10 wt % (or from 0 wt % to 5 wt %, or from 1 wt % to 5 wt %, or from 5 wt % to 10 wt %).

C3 to C12 α-olefins include propylene, butylene, pentylene, hexylene, heptylene, octylene, nonylene, decylene, undecylene, dodecylene, and branched isomers thereof. Propylene is particularly preferred according to some embodiments (e.g., such that the ethylene-based copolymer may be an EP(D)M copolymer), while butylene (1-butene) is preferred in yet other embodiments (e.g., such that the ethylene-based copolymer may be an EB(D)M copolymer). Further, in certain embodiments, ethylene-based copolymers of the present disclosure can have isotactic polypropylene content.

Any polyene suitable in the PEDM is suitable for inclusion in the ethylene-based copolymer, with VNB or ENB and, in particular, ENB preferred. According to yet other embodiments, suitable polyenes may include conjugated dienes. Conjugated dienes include 1,3-butadiene, 2-methyl-1,3-butadiene, 2,3-di($C_1$ to $C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. Dienes also include vinylaromatic compounds: styrene, ortho-, meta- or para-methylstyrene, the "vinyltoluene" commercial mixture, para-(tert-butyl) styrene, methoxystyrenes, chlorostyrenes, vinylmesitylene, divinylbenzene or vinylnaphthalene.

A crystalline ethylene-copolymer may have a Hf of 15 J/g or greater, or from 15 J/g to 45 J/g, or from 15 J/g to 30 J/g, or from 20 J/g to 40 J/g, or from 30 J/g to 45 J/g.

An amorphous ethylene-copolymer may have a Hf from 0 J/g to 14 J/g, or from 0 J/g to 5 J/g, or from 3 J/g to 10 J/g, or from 7 J/g to 14 J/g.

The ethylene-copolymer may have a Mooney viscosity (ML, 1+4 @ 125° C.) of 20 MU to 90 MU, or 20 MU to 50 MU, or 40 MU to 60 MU, or 50 MU to 80 MU, or 60 MU to 90 MU.

An ethylene-based copolymer may be an ethylene-propylene copolymer and, in particular, an EP(D)M terpolymer (e.g., VISTALON™ 7001, available from ExxonMobil; VISTALON™ 7500, available from ExxonMobil; VISTALON™ 6602, available from ExxonMobil; VISTALON™ 2502, available from ExxonMobil; TAFMER™, available from Mitsui Chemicals; or VERSIFY™ available from Dow Chemical) or an EB(D)M terpolymer. Ethylene-based copolymers of the present disclosure can have a weight average molecular weight (Mw) from 10,000 g/mol to 400,000 g/mol, or 100,000 g/mol to 200,000. Ethylene-based copolymers may also, or instead, have a melting point (DSC) of less than 110° C., or less than 100° C.

Compositions described herein can comprise a single ethylene-based copolymer or a mixture of two or more ethylene-based copolymers. Further, the ethylene-based copolymers may be used in combination with any type of thermoplastic polymers and/or synthetic elastomer other than an ethylene-based copolymer.

Polymer Blending

Compositions of the present disclosure may be formed by combining the PEDM and the ethylene-based copolymer using any suitable method known in the polymer processing art. For example, a composition may be made by blending the PEDM and the ethylene-based copolymer in solution and, generally, removing the blend. This polymer composition has predetermined amounts of the PEDM and the ethylene-based copolymer and may be made by independent polymerization of the first and second elastomeric polymeric components. Such individual polymerization may be conducted in series or parallel polymerization reactors or in a single polymerization reactor with at least two different polymerization catalysts. Procedures for the recovery of such a predetermined composition are described in U.S. Pat. No. 4,722,971, which are incorporated herein by reference. The disclosure includes traditional Ziegler-Natta catalyst systems, however metallocene catalyst systems are also contemplated for the present disclosure.

In at least one embodiment, a method for preparing a composition of the PEDM and the ethylene-based copolymer includes contacting in a first reactor a first metallocene catalyst with ethylene, propylene, and a diene to form a PEDM. The method further includes contacting in a second reactor (or the first reactor) a second metallocene catalyst with ethylene and propylene, and optionally a diene, to form an ethylene-based copolymer, and so on for the other ethylene-based copolymer. Methods can include transferring the PEDM to the second reactor or the ethylene-based copolymer to the first reactor and recovering from the second reactor or the first reactor, respectively, a mixture of the PEDM and the ethylene-based copolymer. The recovered polymer composition may then be crosslinked, for example, as described in more detail below.

Alternatively, in at least one embodiment, a blend may be prepared by combining PEDM and the ethylene-based copolymer from their respective reactions and mixed, for example, in a production extruder, such as the extruder on an injection molding machine or on a continuous extrusion line.

In at least one embodiment, the method of blending the polymers may be to melt-blend the polymers in a batch mixer, such as a BANBURY™ or BARBENDER™ mixer. Blending may include melt blending the PEDM and the ethylene-based copolymer in an extruder, such as a single-screw extruder or a twin-screw extruder. Suitable examples of extrusion technology for polymer blends can be described in more detail in PLASTICS EXTRUSION TECHNOLOGY, F. Hensen, Ed. (Hanser, 1988), pp. 26-37, and in POLYPROPYLENE HANDBOOK, E. P. Moore, Jr. Ed. (Hanser, 1996), pp. 304-348, which are incorporated herein by reference.

The PEDM and the ethylene-based copolymer may also be blended by a combination of methods including, but not limited to, solution blending, melt mixing, compounding in a shear mixer and combinations thereof. For example, dry blending followed by melt blending in an extruder, or batch mixing of some components followed by melt blending with other components in an extruder. The PEDM and the ethylene-based copolymer may also be blended using a double-cone blender, ribbon blender, or other suitable blender, or in a Farrel Continuous Mixer (FCM™).

The PEDM and the ethylene-based copolymer and optionally additives (e.g., curatives, crosslinking agents, fillers, plasticizers, compatibilizers, crosslinkers, and the like) may be blended in varying orders, which in some instances may alter the properties of the resultant composition.

In some instances, a master batch that comprises the PEDM, the ethylene-based copolymer, and additives (except curatives and crosslinking agents) may be produced at a first temperature. Then, the curatives and/or crosslinking agents may be mixed into the master batch at a second temperature that is lower than the first temperature.

In some embodiments, the master batch may be produced by mixing together in one step the PEDM and the ethylene-based copolymer and the additives (except curatives and crosslinking agents) until the additives are incorporated (e.g., producing a homogeneous blend). This is referred to herein as a first pass method or first pass blending. After the first pass blending produces the master batch, the curatives and/or crosslinking agents may be mixed into the master batch to produce the final blend.

In alternative embodiments, a two-step mixing process may be used to produce the master batch. For example, in some embodiments, the master batch may be produced by mixing the ethylene-based copolymer (either crystalline, amorphous, or a blend of both) with the additives (except curatives and crosslinking agents) until the additives are incorporated into the ethylene-based copolymer (e.g., producing a homogeneous blend). Then, the resultant blend is mixed with the PEDM and the curatives and/or crosslinking agents. This process is referred to herein as a second pass method or a second pass blending. Alternatively, the curatives and/or crosslinking agents may be mixed into the master batch after addition of the PEDM in the second pass to produce the final blend.

In some second pass blending embodiments, mixing the ethylene-based copolymer/additive (except curatives and crosslinking agents) blend with the PEDM may be done in a mixer or other suitable system without removing the ethylene-based copolymer/additive blend from the mixer (i.e., first pass blending) to produce the master batch. In alternative embodiments, the ethylene-based copolymer/additive (except curatives and crosslinking agents) blend may be removed from a mixer or other suitable system for producing the blend, and, then, mixed with the PEDM in a mixer or other suitable system (i.e., second pass blending) to produce the master batch.

The homogeneous mixture may be achieved by mixing for a certain time that corresponds to producing a homogeneous mixture. In some instances, a mixing parameter of the ethylene-based copolymer and the chosen additives may change when a homogeneous mixture is achieved. For example, when mixing carbon black (an exemplary filler) with the ethylene-based copolymer, the torque may reach a maximum, steady-state where minimal to no appreciable increases in torque are observed.

Compositions

Compositions of the present disclosure include and/or are the reaction product of curatives with the PEDM and the ethylene-based copolymer (as a polymer blend or otherwise) described above (and in whatever form: pellet, bale, or otherwise). As described above, compositions of the present disclosure may further include and/or be the reaction product of curatives with one or more additives (e.g., fillers, plasticizers, compatibilizers, crosslinkers, and the like).

In embodiments where curatives (e.g., crosslinking agents or vulcanizing agents) are present in a composition, the polymers of the composition may be present in at least partially crosslinked form (that is, at least a portion of the polymer chains are crosslinked with each other, e.g., as a result of a curing process typical for EP(D)M rubbers). Accordingly, particular embodiments provide for an at least partially crosslinked elastomeric composition made by mixing (in accordance with any of the above-described methods for polymer blends) a composition comprising: (a) a PEDM and the ethylene-based copolymer; (b) one or more vulcanization activators; (c) one or more vulcanizing agents; and/or (d) one or more further additives.

Suitable vulcanization activators include zinc oxide, stearic acid, and the like. These activators may be mixed in amounts ranging from 0.1 phr to 20 phr. Different vulcanization activators may be present in different amounts. For instance, where the vulcanization activator includes zinc oxide, the zinc oxide may be present in an amount from 1 phr to 20 phr, such as from 2.5 phr to 10 phr, such as about 5 phr, for example, while stearic acid may preferably be employed in amounts ranging from 0.1 phr to 5 phr, such as from 0.1 phr to 2 phr, such as about 1.5 phr, for example).

Any suitable vulcanizing agent may be used. Of particular note are curing agents as described in Col. 19, line 35 to Col. 20, line 30 of U.S. Pat. No. 7,915,354, which description is hereby incorporated by reference (e.g., sulfur, peroxide-based curing agents (VULCUP™ 40 KE available from Arkema of Colombes, France, resin curing agents, silanes, and hydrosilane curing agents). Other examples include phenolic resin curing agents (e.g., as described in U.S. Pat. No. 5,750,625, also incorporated by reference herein). Cure co-agents may also be included (e.g., zinc dimethacrylate (ZDMA) (DYMALINK™ 708, available from Cray Valley) or those described in the already-incorporated description of U.S. Pat. No. 7,915,354).

Further additives may be chosen from any known additives useful for EP(D)M compositions, and include, among others, one or more of:

- Vulcanization accelerators: compositions of the present disclosure can comprise 0.1 phr to 15 phr, or 1 phr to 5 phr, or 2 phr to 4 phr, with examples including thiazoles such as 2-mercaptobenzothiazole or mercaptobenzothiazyl disulfide (MBTS); guanidines such as diphenylguanidine; sulfenamides such as N-cyclohexylbenzothiazolsulfenamide; dithiocarbamates such as zinc dimethyl dithiocarbamate, zinc diethyl dithiocarbamate, zinc dibenzyl dithiocarbamate (ZBEC); and zinc dibutyldithiocarbamate, thioureas such as 1,3-diethylthiourea, thiophosphates and others;
- Processing aids (e.g., polyethylene glycol or zinc soap);
- Carbon black (e.g., having particle size from 20 nm to 600 nm and structure having DBPA (dibutyl phthalate absorption number) within the range from 0 to 150, as measured by the DBP method. Compositions of the present disclosure may comprise carbon black from 1 phr to 500 phr, preferably from 1 phr to 200 phr, or from 50 phr to 150 phr;
- Mineral fillers (talc, calcium carbonate, clay, silica, aluminum trihydrate, and the like), which may be present in the composition from 1 phr to 200 phr, preferably from 20 phr to 100 phr, or from 30 phr to 60 phr;
- Where foaming may be desired, sponge or foaming grade additives, such as foaming agent or blowing agent, particularly in very high Mooney viscosity embodiments, such as those suitable for sponge grades. Examples of such agents include: azodicarbonamide (ADC), ortho-benzo sulfonyl hydrazide (OBSH), p-toluenesulfonylhydrazide (TSH), 5-phenyltetrazole (5-PT), and sodium bicarbonate in citric acid. Microcapsules may also or instead be used for such foaming applications. These may include a thermo-expandable microsphere comprising a polymer shell with a propellant contained therein. Suitable examples are described in U.S. Pat. Nos. 6,582,633 and 3,615,972, WIPO Publication Nos. WO 99/46320 and WO 99/43758, and contents of which hereby are incorporated by reference. Examples of such thermo-expandable microspheres include EXPANCEL™ products commercially available from Akzo Nobel N. V., and ADVANCELL™ products available from Sekisui. In other embodiments, sponging or foaming may be accomplished by direct injection of gas and/or liquid (e.g., water, $CO_2$, $N_2$) into the rubber in an extruder, for foaming after passing the composition through a die; and
- Various other additives may also be included, such as antioxidants (e.g., 1,2-dihydro-2,2,4-trimethylquinoline), stabilizers, anticorrosion agents, UV absorbers, antistatic s, slip agents, moisture absorbents (e.g., calcium oxide), pigments, dyes or other colorants.

The elastomeric compositions of the present disclosure may optionally comprise carbon black at 1 phr to 500 phr, such as 5 phr to 250 phr, such as 10 phr to 125 phr, such as 50 phr, for example.

The at least partially crosslinked polymer compositions of the present disclosure are formed by mixing the above-described components in any suitable manner described in the Polymer Blending section above, e.g. BANBURY™ mixer. Mixing in these embodiments may include any one or more of typical mixing processes for EP(D)M compositions, such as open mill mixing, mixing using internal mixers or kneaders, and extrusion (e.g., through a twin-screw extruder).

Further, in some embodiments, additives may be incorporated into a polymer blend directly or as part of a master batch, i.e., an additive package containing several additives to be added at one time in predetermined proportions. The master batch may be added in any suitable amount. For example, a master batch comprising an additive may be used in an amount ranging from about 0.1 wt % to about 10 wt %, or from about 0.25 wt % to about 7.5 wt %, or from about 0.5 wt % to about 5 wt %, or from about 1 wt % to about 5 wt %, or from about 2 wt % to about 4 wt %, based on the total weight of the polymer blend and the master batch. This is a common practice in polymer processing, typically used for addition of color, additives, and fillers to final compositions. Dispersion (or "letdown") of the master batch may take place as part of a processing step used to fabricate articles, such as in the extruder on an injection molding machine or on a continuous extrusion line, or during a separate compounding process.

The compositions described herein comprising the PEDM and the ethylene-based copolymer can have a green rubber-to-rubber tack force after blending of 500 g of force/inch width or greater, or 500 g of force/inch width to 2500 g of force/inch width, or 1000 g of force/inch width to 5000 g of force/inch width, or 1500 g of force/inch width to 5000 g of force/inch width, or 1250 g of force/inch width to 4500 g of force/inch width, or 1500 g of force/inch width to 4000 g of force/inch width. Further, the compositions described herein comprising the PEDM and the ethylene-based copolymer can have an aged rubber-to-rubber tack force (1 month, room temperature) of 500 g of force/inch width or greater, or 500 g of force/inch width to 2500 g of force/inch width, or 1000 g of force/inch width to 6000 g of force/inch width, or 1500 g of force/inch width to 5000 g of force/inch width, or 2000 g of force/inch width to 5000 g of force/inch width, or 4000 g of force/inch width to 6000 g of force/inch width.

The compositions described herein comprising the PEDM and the ethylene-based copolymer can have percent retention in a green rubber-to-rubber tack force from blending to aging at room temperature for 1 month (aged tack force divided by as blended tack force times 100) of 50% to 250%, or 90% to 200%, or 100% to 250%, or 150% to 250%. For example, 200% retention in tack force means the tack force doubled with aging.

Rubber-to-rubber tack testing can be measured based on Modified ASTM D3330/D330M-04(2010) Method F. In particular, the following modifications to the ASTM method were utilized: (1) instead of a 2 μm finish stainless steel substrate per the ASTM method, an uncured rubber sheeting substrate of the rubber being tested was used; and (2) for conditioning, instead of the 24 hours at 23° C. in the ASTM method, the sample was tested at ambient condition. This method provides the benefit of a larger test area and longer dwell time, thus providing more extensive testing of the sample versus the Tel-Tak method.

Extrudability of unvulcanized compounds can be tested, evaluated, and determined using a standard test method for rubber property, thus through a screw-type extruder equipped with ASTM Extrusion Die, such as Garvey type. At an extrusion rate of about 170 rpm or greater, the compositions described herein comprising the PEDM and the ethylene-based copolymer can have an extrusion output (g/min) of about 180 g/min or greater, such as about 190 g/min or greater, such as about 200 g/min or greater. The Garvey die extrusion testing can be measured based on the ASTM D2230 method.

The compositions described herein comprising the PEDM and the ethylene-based copolymer can have a green strength of from 0.2 MPa to 0.9 MPa, such as from 0.3 MPa to 0.8 MPa, such as from 0.4 MPa to 0.7 MPa.

The compression set of a material is a permanent deformation remaining after release of a compressive stress. The compression set is typically expressed as the percentage of the original specimen thickness for a Method A (constant force) or the percentage of the original deflection for a Method B (constant deflection). The compression set can be measured by the ASTM D395-B method. In at least one embodiment, the compositions of the present disclosure comprising the PEDM and the ethylene-based copolymer have a compression set (%) of from 1% to 25%, such as from 2% to 20%, such as from 3% to 15%, such as from 3% to 10%, such as from 4% to 8%, when the compositions are press-cured for 35 minutes at 180° C. In another embodiment, the compositions of the present disclosure comprising the PEDM and the ethylene-based copolymer have a compression set (%) of from 1% to 50%, such as from 2% to 40%, such as from 3% to 30%, when the compositions are press-cured for 72 hours at ambient temperature. In another embodiment, the compositions of the present disclosure comprising the PEDM and the ethylene-based copolymer have a compression set (%) of from 40% to 95%, such as from 45% to 80%, such as from 50% to 75%, when the compositions are press-cured for 72 hours at a temperature of about 100° C. or greater.

The compression set of a material is dependent of the crosslinking density of the material, which is defined as the torque difference between a maximum torque (also referred to as "MH") and a minimum torque (also referred to as "ML"). MH, ML, and the torque difference "MH-ML" are evaluated by a Moving Die Rheometer (MDR) testing method, a standard testing method of rubber curing. The MDR can be measured by the ASTM D5289 method, often reported in deciNewton meter (dN·m). The compositions of the present disclosure comprising the PEDM and the ethylene-based copolymer can have a crosslinking density of 2 dN·m to 50 dN·m, such as 3 dN·m to 40 dN·m, such as 4 dN·m to 30 dN·m, such as 5 dN·m to 25 dN·m.

The compositions of the present disclosure comprising the PEDM and the ethylene-based copolymer can have a tensile strength (MPa) of 4 MPa to 150 MPa, such as 5 MPa to 125 MPa, such as 5 MPa to 100 MPa, such as 5 MPa to 50 MPa, such as 5 MPa to 25 MPa, such as 50 MPa to 100 MPa.

The elongation at break is the percent elongation calculated by dividing the elongation at the moment of rupture by the initial gauge length and multiplying by 100. The elongation at break after oil aging can be measured by the ASTM D471 method. The compositions of the present disclosure comprising the PEDM and the ethylene-based copolymer can have an elongation after oil aging of from 25% to 750%, such as from 30% to 500%, such as from 40% to 300%. Alternately, the compositions of the present disclosure comprising the PEDM and the ethylene-based copolymer can have an elongation after oil aging of from 150% to 700%, such as from 160% to 600%, such as from 170% to 500%. Alternately, the compositions of the present disclosure comprising the PEDM and the ethylene-based copolymer can have an elongation after oil aging of from 50% or greater, such as 50% to 100%, such as from 60% to 100%, such as from 70% to 100%, such as from 80% to 100%. Oil aging may occur at 100° C. or greater, such as 125° C. or greater, such as 150° C. or greater. In at least one embodiment, the compositions of the present disclosure comprising the PEDM and the ethylene-based copolymer can have an elongation after oil aging at 150° C. for 7 days of from 100% to 500%, such as from 110% to 400%, such as from 120% to 300%, thus, after press-cure at 180° for 30 minutes. In another embodiment, the compositions of the present disclosure comprising the PEDM and the ethylene-based copolymer can have an elongation after oil aging at 100° C. for 24 hours of from 100% to 500%, such as from 110% to 400%, such as from 120% to 300%.

End Uses

Compositions of the present disclosure may be used as one or more components of hoses or belts (e.g., V-belt, a flat belt, a toothed or synchronous belt, multi-ribbed belt, or conveyor belts).

To form the elastomeric hose or belt body portion in accordance with at least one embodiment of the present disclosure, the polymers may be blended according to suitable mixing methods and, as described above, with conventional rubber compounding ingredients including, but not limited to, fillers, plasticizers, stabilizers, vulcanization agents/curatives, coagents, and accelerators, in amounts conventionally employed.

FIG. 1 is a fragmented perspective view of a transmission belt. As shown in FIG. 1, synchronous belt 100 includes elastomeric main body portion 102 and sheave contact portion 104 positioned along the inner periphery of main body portion 102. Main body portion 102 comprises compositions of the present disclosure comprising the PEDM and the ethylene-based copolymer. Sheave contact portion 104 is configured to form alternating transverse projections 106 and troughs 108 configured to couple with a transverse-grooved pulley or sprocket. Tensile layer 110 is positioned within a main body portion 102 for providing support and strength to belt 100. Tensile layer 110 includes a plurality of tensile cords 112 disposed longitudinally along the length of main body portion 112. Cords 112 comprise any suitable material, such as one or more of cotton, rayon, polyamide, polyester, aramid, steel, glass, carbon, polyketone, basalt, boron, or discontinuous fibers oriented for low load carrying capability. Reinforcing fabric 114 is disposed on projections 106 and troughs 108 and to form a sheave contact portion. Reinforcing fabric 114 may be of any suitable configuration such as a conventional weave consisting of warp and weft threads at an angle, or may include warp threads held together by space pick cords, or a knitted or braided configuration, or a nonwoven fabric. Suitable fabrics include one or more of cotton, polyester, polyamide, acrylic, aramid, polyketone, hemp, jute, or fiberglass.

Figure 2:
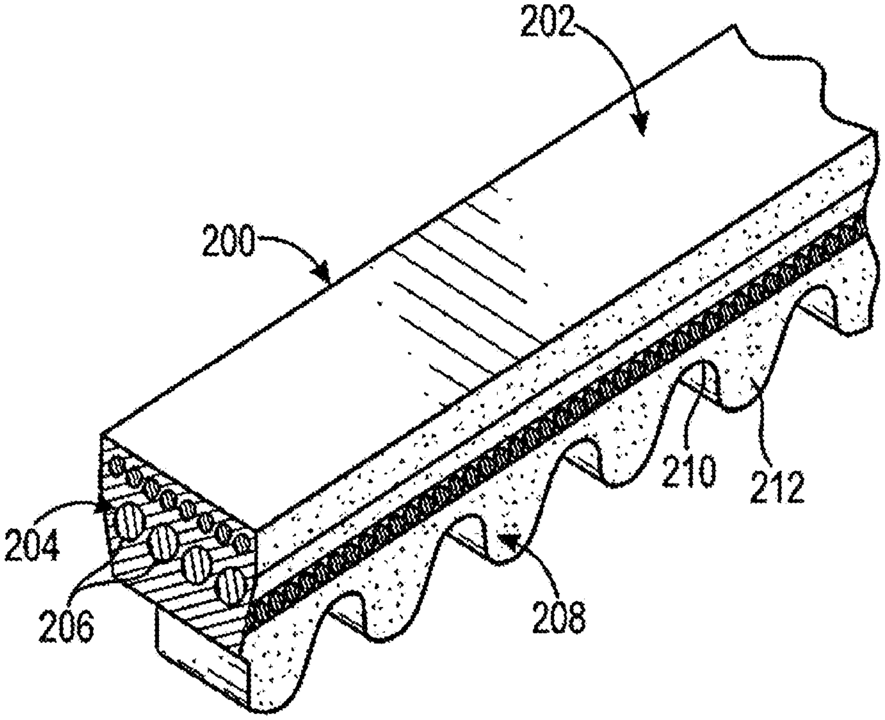
FIG. 2 is a fragmented perspective view of a transmission belt in accordance with further embodiments of the present disclosure.

FIG. 2 is a fragmented perspective view of a transmission belt. As shown in FIG. 2, notched V-belt 200 includes an elastomeric body portion 202 and tensile layer 204 comprising cords 206. Main body portion 202 comprises compositions of the present disclosure comprising the PEDM and the ethylene-based copolymer. Cords 206 comprise any suitable material, such as one or more of cotton, rayon, polyamide, polyester, aramid, steel, glass, carbon, polyketone, basalt, boron, or discontinuous fibers oriented for low load carrying capability. V-belt 200 includes sheave contact portion 208 having two juxtaposed sides of the belt, designed to wedge into a V-sheave. V-belt 200 includes troughs 210 and projections 212. Included in the category of V-belts are those V-belts designed for continuously variable transmission ("CVT") applications, which often exhibit a belt body relatively wider than the belt thickness.

Figure 3:
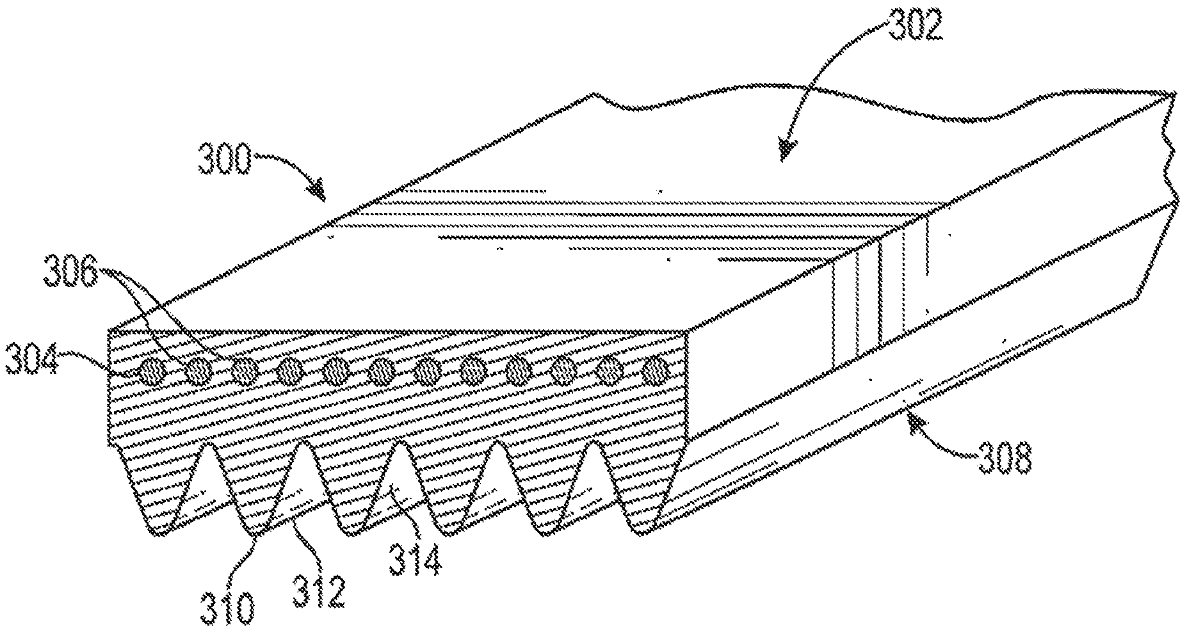
FIG. 3 is a fragmented perspective view of a transmission belt in accordance with yet further embodiments of the present disclosure.

FIG. 3 is a fragmented perspective view of a transmission belt. As shown in FIG. 3, multi-V-ribbed belt 300 includes a main body portion 302 and also tensile reinforcement member 304 comprising cords 306. Main body portion 302 comprises compositions of the present disclosure comprising the PEDM and the ethylene-based copolymer. Longitudinally grooved sheave contact portion 308 comprises a plurality of projections 310 alternating with a plurality of troughs 312, which together define driving surfaces 314 of the belt 300. In each of these instances of FIG. 1, FIG. 2, and FIG. 3, the respective sheave contact portion is coupleable/coupled with the respective main body portion and may be formed from the same material or layered with different material.

Figure 4:
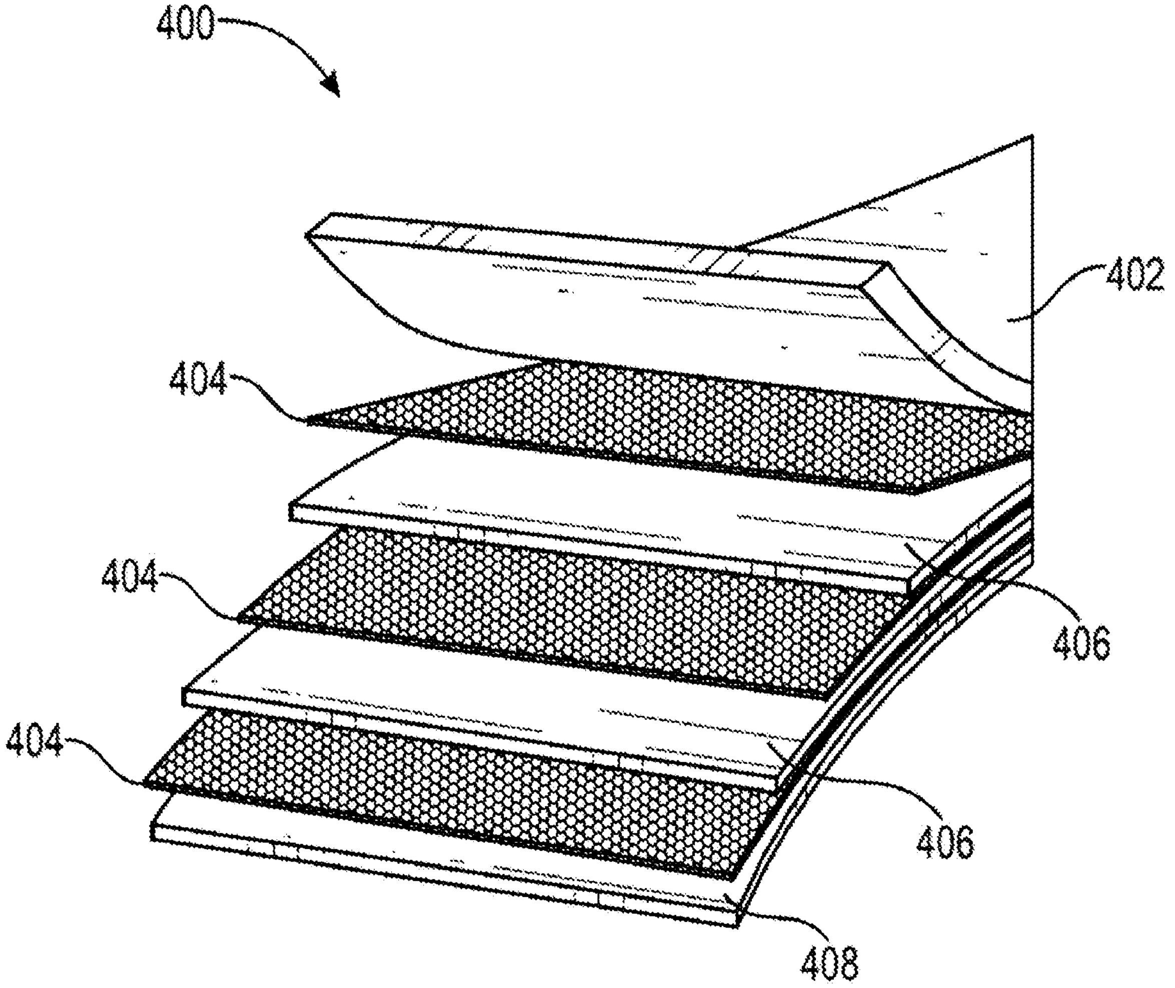
FIG. 4 illustrates an example conveyor belt construction comprising, in order, (a) a cover rubber layer, (b) alternating layers of fabric and rubber skims, and (c) a bottom rubber layer 408.

Conveyor belts can be manufactured as a layered composition of calendared sheets of compositions of the present disclosure comprising the PEDM and the ethylene-based copolymer and reinforcing fabrics. For example, FIG. 4 illustrates an example conveyor belt construction 400 comprising, in order, (a) a cover rubber layer 402, (b) alternating layers of fabric 404 and rubber skims 406, and (c) a bottom rubber layer 408. Other layers may be included in other conveyor belt constructions. The cover rubber layer 402, the rubber skims 406, and/or the bottom rubber layer 408 compositions of the present disclosure comprising the PEDM and the ethylene-based copolymer.

Reinforcing fabric 404 may be of any suitable configuration such as a conventional weave consisting of warp and weft threads at an angle, or may include warp threads held together by space pick cords, or a knitted or braided configuration, or a nonwoven fabric. Suitable fabrics include one or more of cotton, polyester, polyamide, acrylic, aramid, polyketone, hemp, jute, or fiberglass.

Manufacturing conveyor belts generally proceeds by layering the above layers (or other desired layer order) using a calendaring process. Then, the calendared layered structure is cured. High tack in the rubber layers improves fusion between adjacent layers and mitigates the formation of air bubbles between layers.

Figure 5:
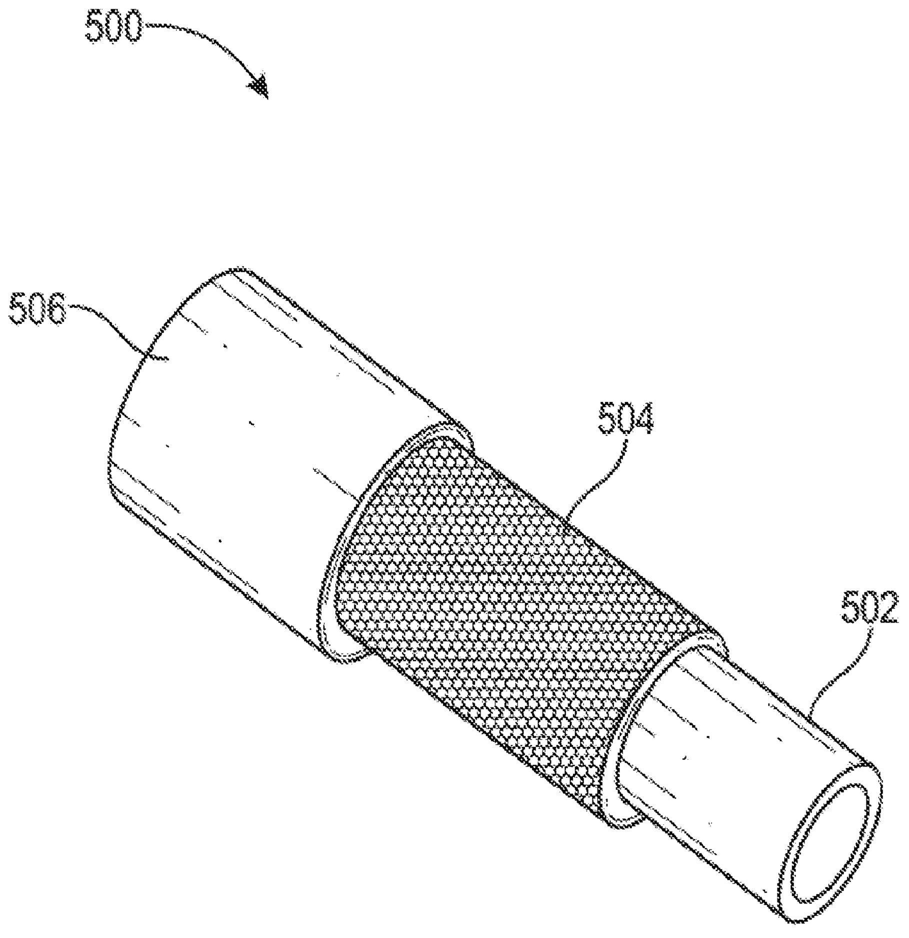
FIG. 5 illustrates an example hose construction comprising, in order, (a) an inner rubber tubular, (b) a reinforcing fabric, and (c) an outer rubber layer.

Hoses can be manufactured as layered compositions by extrusion of compositions of the present disclosure comprising the PEDM and the ethylene-based copolymer. FIG. 5 illustrates an example hose construction 500 comprising, in order, (a) an inner rubber tubular 502, (b) a reinforcing fabric 504, and (c) an outer rubber layer 506. Other layers may be included in other hose constructions. The inner rubber tubular 502 and/or the outer rubber layer 506 may comprise compositions of the present disclosure comprising the PEDM and the ethylene-based copolymer.

Reinforcing fabric 504 may be of any suitable configuration such as a conventional weave consisting of warp and weft threads at an angle, or may include warp threads held together by space pick cords, or a knitted or braided configuration, or a nonwoven fabric. Suitable fabrics include one or more of cotton, polyester, polyamide, acrylic, aramid, polyketone, hemp, jute, or fiberglass.

Manufacturing conveyor belts generally proceeds by extruding the inner rubber tubular 502, covering the inner rubber tubular 502 with the reinforcing fabric 504, and extruding the outer rubber layer 506 onto the reinforcing fabric 504. High tack in the rubber layers improves fusion between adjacent layers and mitigates the formation of air bubbles between layers.

Other Mechanical Goods

Compositions of the present disclosure may be used as one or more components of industrial and garden hoses, both molded and extruded sponge parts, and gaskets and seals. In such components, the compositions of the present disclosure (comprising the PEDM, the ethylene-based copolymer, optionally the amorphous ethylene-based copolymer, and optionally one or more additives) may be adhered to another polymer composition including cotton, rayon, polyamide, polyester, aramid, steel, aluminum, glass, carbon, polyketone, basalt, and boron, each of which may be in a form that includes a film, a belt, a hose, a tire, a woven fabric, or a nonwoven fabric. Because of the enhanced adhesion properties of the compositions of the present disclosure, the adherence to the foregoing materials may be significantly better than adherence between EP(D)M and the material. For example, adhesion between a film having a composition of the present disclosure and a film (substrate) of polyester or polyamide may have a rubber to substrate tack exceeding 20 gm force/inch width. Additionally, polyester or polyamide fibers may adhere more strongly to the compositions of the present disclosure than an EP(D)M alone.

Example Embodiments

A first nonlimiting example embodiment of the present disclosure is an elastomeric composition comprising: 5 phr to 80 phr of a PEDM terpolymer comprising 55 wt % to 95 wt % propylene, 2.5 wt % to 40 wt % α-olefin, and 0.05 wt % to 25 wt % diene, said wt % based on the weight of the PEDM terpolymer, wherein the PEDM terpolymer has Mooney viscosity (ML(1+4)) of 5 MU to 90 MU; 20 phr to 95 phr of an ethylene-based copolymer selected from the group consisting of (a) a crystalline ethylene-based copolymer comprising 60 wt % to 95 wt % ethylene, 0 wt % to 10 wt % of one or more dienes, and 5 wt % to 40 wt % C3 to C12 α-olefin, said wt % based on the total weight of the crystalline ethylene-based copolymer, (b) an amorphous ethylene-based comprising 40 wt % to 59 wt % ethylene, 0 wt % to 10 wt % of one or more dienes, and 40 wt % to 60 wt % C3 to C12 α-olefin, said wt % based on the total weight of the amorphous ethylene-based copolymer, and (c) a combination of (a) and (b); and 10 phr to 200 phr of a process oil. The first nonlimiting example embodiment may further include one or more of: Element 1: the elastomeric composition comprising: 5 phr to 50 phr of the PEDM; 50 phr to 95 phr of the ethylene-based copolymer; and 10 phr to 200 phr of a process oil; Element 2: Element 1 and wherein the composition has a green rubber-to-rubber tack force of 500 g of force/inch width or greater; Element 3: Element 1 and wherein the composition has a green rubber-to-rubber tack force of 1000 g of force/inch width to 5000 g of force/inch width; Element 4: Element 1 and wherein the composition has a rubber-to-rubber tack force after aging at room temperature for 1 month of 500 g of force/inch width or greater; Element 5: Element 1 and wherein the composition has a rubber-to-rubber tack force after aging at room temperature for 1 month of 1000 g of force/inch width or greater to 6000 g of force/inch width; Element 6: Element 1 and wherein the composition has a percent retention in a green rubber-to-rubber tack force from blending to aging at room temperature for 1 month of 50% to 250%; Element 7: Element 1 and wherein the composition has a percent retention in a green rubber-to-rubber tack force from blending to aging at room temperature for 1 month of 100% to 250%; Element 8: the elastomeric composition comprising: 5 phr to 80 phr of the PEDM terpolymer; 20 phr to 95 phr of the crystalline ethylene-based copolymer; 0 phr to 75 phr of the amorphous ethylene-based copolymer; and 10 phr to 30 phr of a process oil; Element 9: wherein the crystalline ethylene-based copolymer has a Mooney viscosity (ML(1+4)) at 125° C. of 20 MU to 90 MU; Element 10: wherein the crystalline ethylene-based copolymer has an Hf of 15 J/g or greater; Element 11: wherein the amorphous ethylene-based copolymer has a Mooney viscosity (ML(1+4)) at 125° C. of 20 MU to 90 MU; Element 12: wherein the amorphous ethylene-based copolymer has an Hf from 0 J/g to 14 J/g; Element 13: wherein the PEDM terpolymer has a number average molecular weight of 50,000 g/mol to 150,000 g/mol; Element 14: PEDM terpolymer has a weight average molecular weight of 120,000 g/mol to 320,000 g/mol; Element 15: wherein the PEDM terpolymer has a polydispersity index of 2 to 2.7; and Element 16: the elastomeric composition further comprising carbon black at 1 phr to 500 phr. Examples of combinations include, but are not limited to, Element 1 in combination with two or more of Elements 2-7; two or more of Elements 9-16 in combination; one or more Elements 9-16 in combination with Element 1 and optionally in further combination with one or more of Elements 2-7; and Element 8 in combination with one or more Elements 9-16.

A second nonlimiting example embodiment of the present disclosure is a hose comprising: an inner rubber tubular; a reinforcing fabric around the inner rubber tubular; and a rubber layer around the reinforcing fabric; wherein the inner rubber tubular and/or the rubber layer comprise an elastomeric composition comprising: 5 phr to 80 phr of a PEDM terpolymer comprising 55 wt % to 95 wt % propylene, 2.5 wt % to 40 wt % α-olefin, and 0.05 wt % to 25 wt % diene, said wt % based on the weight of the PEDM terpolymer, wherein the PEDM terpolymer has Mooney viscosity (ML (1+4)) of 5 MU to 90 MU; 20 phr to 95 phr of an ethylene-based copolymer selected from the group consisting of (a) a crystalline ethylene-based copolymer comprising 60 wt % to 95 wt % ethylene, 0 wt % to 10 wt % of one or more dienes, and 5 wt % to 40 wt % C3 to C12 α-olefin, said wt % based on the total weight of the crystalline ethylene-based copolymer, (b) an amorphous ethylene-based comprising 40 wt % to 59 wt % ethylene, 0 wt % to 10 wt % of one or more dienes, and 40 wt % to 60 wt % C3 to C12 α-olefin, said wt % based on the total weight of the amorphous ethylene-based copolymer, and (c) a combination of (a) and (b); and 10 phr to 200 phr of a process oil. The second nonlimiting example may further include one or more of: Element 1; Element 2; Element 3; Element 4; Element 5; Element 6; Element 7; Element 9; Element 10; Element 11; Element 12; Element 13; Element 14; Element 15; Element 16; and Element 17: wherein the reinforcing fabric is selected from the group consisting of: cotton, polyester, polyamide, acrylic, aramid, polyketone, hemp, jute, fiberglass, and any combination thereof. Examples of combinations include, but are not limited to, Element 1 in combination with two or more of Elements 2-7; two or more of Elements 9-16 in combination; one or more Elements 9-16 in combination with Element 1 and optionally in further combination with one or more of Elements 2-8.

A third nonlimiting example embodiment of the present disclosure is a hose comprising: an inner rubber tubular; a reinforcing fabric around the inner rubber tubular; and a rubber layer around the reinforcing fabric; wherein the inner rubber tubular and/or the rubber layer comprise an elastomeric composition comprising: 5 phr to 50 phr of a PEDM, wherein the PEDM terpolymer has Mooney viscosity (ML (1+4)) of 5 MU to 90 MU; 50 phr to 95 phr of an ethylene-based copolymer selected from the group consisting of (a) a crystalline ethylene-based copolymer comprising 60 wt % to 95 wt % ethylene, 0 wt % to 10 wt % of one or more dienes, and 5 wt % to 40 wt % C3 to C12 α-olefin, said wt % based on the total weight of the crystalline ethylene-based copolymer, (b) an amorphous ethylene-based comprising 40 wt % to 59 wt % ethylene, 0 wt % to 10 wt % of one or more dienes, and 40 wt % to 60 wt % C3 to C12 α-olefin, said wt % based on the total weight of the amorphous ethylene-based copolymer, and (c) a combination of (a) and (b); and 10 phr to 200 phr of a process oil. The third nonlimiting example may further include one or more of: Element 2; Element 3; Element 4; Element 5; Element 6;

Element 7; Element 9; Element 10; Element 11; Element 12; Element 13; Element 14; Element 15; Element 16; and Element 17.

A fourth nonlimiting example embodiment of the present disclosure is a belt comprising: a first outer rubber layer; a second outer rubber layer; and a reinforcing fabric between the first and second outer rubber layers; wherein the first outer rubber layer and/or the second outer rubber layer comprise an elastomeric composition comprising: 5 phr to 80 phr of a PEDM terpolymer comprising 55 wt % to 95 wt % propylene, 2.5 wt % to 40 wt % α-olefin, and 0.05 wt % to 25 wt % diene, said wt % based on the weight of the PEDM terpolymer, wherein the PEDM terpolymer has Mooney viscosity (ML(1+4)) of 5 MU to 90 MU; 20 phr to 95 phr of an ethylene-based copolymer selected from the group consisting of (a) a crystalline ethylene-based copolymer comprising 60 wt % to 95 wt % ethylene, 0 wt % to 10 wt % of one or more dienes, and 5 wt % to 40 wt % C3 to C12 α-olefin, said wt % based on the total weight of the crystalline ethylene-based copolymer, (b) an amorphous ethylene-based comprising 40 wt % to 59 wt % ethylene, 0 wt % to 10 wt % of one or more dienes, and 40 wt % to 60 wt % C3 to C12 α-olefin, said wt % based on the total weight of the amorphous ethylene-based copolymer, and (c) a combination of (a) and (b); and 10 phr to 200 phr of a process oil. The fourth nonlimiting example may further include one or more of: Element 9; Element 10; Element 11; Element 12; Element 13; Element 14; Element 15; Element 16; and Element 17.

A fifth nonlimiting example embodiment of the present disclosure is a belt comprising: a first outer rubber layer; a second outer rubber layer; and a reinforcing fabric between the first and second outer rubber layers; wherein the first outer rubber layer and/or the second outer rubber layer comprise an elastomeric composition comprising: 5 phr to 80 phr of a PEDM terpolymer, wherein the PEDM terpolymer has Mooney viscosity (ML(1+4)) of 5 MU to 90 MU; 20 phr to 95 phr of a crystalline ethylene-based copolymer comprising 60 wt % to 95 wt % ethylene, 0 wt % to 10 wt % of one or more dienes, and 5 wt % to 40 wt % C3 to C12 α-olefin, said wt % based on the total weight of the crystalline ethylene-based copolymer; 0 phr to 75 phr of an amorphous ethylene-based copolymer comprising 40 wt % to 59 wt % ethylene, 0 wt % to 10 wt % of one or more dienes, and 40 wt % to 60 wt % C3 to C12 α-olefin, said wt % based on the total weight of the amorphous ethylene-based copolymer; and 10 phr to 30 phr of a process oil. The fifth nonlimiting example may further include one or more of: Element 9; Element 10; Element 11; Element 12; Element 13; Element 14; Element 15; Element 16; and Element 17.

A sixth nonlimiting example embodiment of the present disclosure is a belt comprising: a first outer rubber layer; a second outer rubber layer; and alternating layers of rubber skim layers and reinforcing fabrics between the first and second outer rubber layers; wherein the first outer rubber layer and/or the second outer rubber layer and/or the rubber skim layers comprise an elastomeric composition comprising: 5 phr to 80 phr of a PEDM terpolymer, wherein the PEDM terpolymer has Mooney viscosity (ML(1+4)) of 5 MU to 90 MU; 20 phr to 95 phr of a crystalline ethylene-based copolymer comprising 60 wt % to 95 wt % ethylene, 0 wt % to 10 wt % of one or more dienes, and 5 wt % to 40 wt % C3 to C12 α-olefin, said wt % based on the total weight of the crystalline ethylene-based copolymer; 0 phr to 75 phr of an amorphous ethylene-based copolymer comprising 40 wt % to 59 wt % ethylene, 0 wt % to 10 wt % of one or more dienes, and 40 wt % to 60 wt % C3 to C12 α-olefin, said wt % based on the total weight of the amorphous ethylene-based copolymer; and 10 phr to 30 phr of a process oil. The sixth nonlimiting example may further include one or more of: Element 9; Element 10; Element 11; Element 12; Element 13; Element 14; Element 15; Element 16; and Element 17.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

To facilitate a better understanding of the embodiments of the present invention, the following examples of preferred or representative embodiments are given. In no way should the following examples be read to limit, or to define, the scope of the invention.

Examples

Mooney viscosity (ML) can be determined by ASTM D1646-17 ((1+4), 125° C., 2 $s^{-1}$ shear rate). Melt Flow Rate (MFR) is measured according to ASTM D1238 test method, at 230° C. and 2.16 kg load, and is expressed as dg/min or g/10 min. Ethylene content is determined using FTIR according the ASTM D3900 and is not corrected for diene content. ENB is determined using FTIR according to ASTM D6047. Mooney scorch is measured according to ASTM D1646-17 test method. Moving Die Rheometer is measured according to ASTM D5289 test method. Tensile strength, elongation, and green strength are measured according to ASTM D412 test method. Hardness is measured according to ASTM D2240 test method. Abrasion resistance test is measured according to DIN 53516 test method. Tear strength is measured according to ASTM D624 test method. Compression set is measured according to ASTM D395-B test method. Die C tear strength is measured according to ASTM D624 test method. Tensile and elongation after oil aging is measured according to ASTM D471 test method. Garvey die extrusion and evaluation were conducted based on the ASTM D2230 test method.

Molecular weights (number average molecular weight (Mn), weight average molecular weight (Mw), and z-average molecular weight (Mz)) were determined using a Polymer Laboratories Model 220 high temperature GPC-SEC equipped with on-line differential refractive index (DRI), light scattering (LS), and viscometer (VIS) detectors. It used three Polymer Laboratories PLgel 10 m Mixed-B columns for separation using a flow rate of 0.54 ml/min and a nominal injection volume of 300 μL. The detectors and columns were contained in an oven maintained at 135° C. The stream emerging from the SEC columns was directed into the miniDAWN (Wyatt Technology, Inc.) optical flow cell and then into the DRI detector. The DRI detector was an integral part of the Polymer Laboratories SEC. The viscometer was inside the SEC oven, positioned after the DRI detector. The details of these detectors as well as their calibrations have been described by, for example, T. Sun, P. Brant, R. R. Chance, and W. W. Graessley, in 34(19) Macromolecules, 6812-6820, (2001).

Table 1 illustrates the polymer characteristics of several PEDM polymers used in making the compounds of Examples 1 and 2. The EP(D)M polymers used were VISTALON™ 7001, which is an ethylene-propylene copolymer having a Mooney Viscosity (ML, 1+4 @ 125° C.) of 60 MU and an ethylene content of 73 wt %, and VISTALON™ 2502, which is an ethylene-propylene copolymer having a Mooney Viscosity (ML, 1+4 @ 125° C.) of 26 MU and an ethylene content of 49 wt %. Such elastomeric formulations were found to be suitable for hoses applications, for example.

TABLE 1

Polymer Compositions

| PEDM ID | C2 % | ENB % | ML | MFR | $M_n$ (g/mol) | $M_w$ (g/mol) | $M_w/M_n$ | $T_g$ (° C.) |
|---|---|---|---|---|---|---|---|---|
| PEDM-1 | 4.6 | 2.8 | 15 | 7.1 | 82537 | 167793 | 2.03 | −6.2 |
| PEDM-2 | 5.2 | 5.4 | 16 | 7.0 | 78935 | 170756 | 2.16 | −3.0 |
| PEDM-3 | 5.3 | 2.9 | 54 | 0.61 | 145809 | 313207 | 2.15 | −6.5 |
| PEDM-4 | 15.3 | 2.8 | 15 | 6.8 | 73360 | 154333 | 2.10 | −18.1 |

Example 1. Compositions comprising EP(D)M polymer, carbon black, oil, and curatives were prepared in a BANBURY™ mixer or Farrel BANBURY™ mixer, Model OOC, which has a mixer volume of 1.57 or 4.3 L, respectively. Table 2 shows the representative compositions. A mix was adopted for compounding using a fill factor of 70%. At the start of mixing, polymer, carbon black and additives were introduced with the rotor speed at 50 rpm. The ram was raised three times during the mixing cycle. Mixing was continued for 5 minutes at which time the batch was discharged. The temperature of the discharged batch on an average was about 250° F. About 5 grams of the compound master batch was isolated for rheology measurements.

Table 2 shows a peroxide cured EP(D)M hose formulation used in this study. The control formulation contains VISTALON™ 7500 EP(D)M. Polymer content is 100 phr, which includes both the VISTALON™ 7500 control polymer and PEDM. That is, a portion of the VISTALON™ 7500 EP(D)M was replaced by the PEDM polymer at a level of 10 phr or 20 phr. ESCOREZ™ 5600 was added at 5 phr in one formulation as a comparative example. The masterbatch formulations, with the exclusion of the curatives were prepared in the first pass as described in Table 2. The average batch discharge temperature from the mixer was about 300° F. The curatives were added in a second pass to finalize the compound. The compounds used in all the testing were prepared by the Farrel BANBURY™ OOC mixer except for those used for the Garvey die extrusion which were prepared by the BANBURY™ mixer.

In Tables 2 and 3, "Polymer" indicates the respective amount of the EP(D)M plus PEDM polymer as in Examples E1-E8 included in the composition; carbon black N550 is a carbon black (pellet form available from Cabot); SUNPAR™ 2280 is a paraffinic process oil; AGERITE™ RESIN D™ is the antioxidant 1,2-dihydro-2,2,4-trimethylquinoline (available from Vanderbilt Chemicals); EGDMA is a vulcanizing/crosslinking agent; and VULCUP™ 40 KE is an organic peroxide vulcanizing/crosslinking agent. The composition is considered a useful composition for EP(D)M compounds, and therefore is taken as useful for testing the processability of Examples E1.1-E1.8 as compared to comparative Examples C1.1 and C1.2. The oil content in all the formulations (E1.1-E1.8) is 45 phr.

TABLE 2

Blend Compositions and Conditions

| Peroxide cure | phr |
|---|---|
| First Pass | |
| VISTALON ™ 7500 + PEDM | 100 |
| N550 Carbon Black | 110 |
| Paraffinic Oil (SUNPAR ™ 2280) | 45 |
| AGERITE ™ Resin D ™ | 1.5 |
| EGDMA | 2 |
| Second Pass | |
| VULCUP ™ 40 KE | 7 |
| TOTAL: | 265.5 |
| 1st PASS MASTERBATCH* | |
| 50 RPM | |
| 0'-Add polymer, black, oil, etc. | |
| Sweep @ 140° F. | |
| Sweep @ 220° F. | |
| Sweep @ 300° F. | |
| Ram Pressure 60 psi | |
| 2nd PASS FINAL | |
| 50 RPM | |
| 0'-Add masterbatch and VULCUP ™ 40 KE | |
| Sweep @ 140° F. | |
| Sweep @ 160° F. | |
| Ram Pressure 60 psi | |

*5 phr of ESCOREZ ™ 5600 was added in the first pass for the formulation of C2.

The curatives were added to the master batch on the second pass. The batch was passed several times through the mill to ensure a homogeneous dispersion of the curatives. The batches containing the curatives were cured in an electric press and tested for various physical and mechanical properties.

The rubber-to-rubber tack testing was carried out based on Modified ASTM D3330/D330M-04(2010) Method B and F. In particular, the following modifications to the ASTM method were utilized: (1) instead of a 2 μm finish stainless steel substrate per the ASTM method, an uncured rubber sheeting substrate of the same rubber being tested was used;

and (2) for conditioning, instead of the 24 hours at 23° C. in the ASTM method, the sample was tested at ambient condition. This method provides the benefit of a larger test area and longer dwell time, thus providing more extensive testing of the sample versus the Tel-Talc method.

Table 3 includes the mechanical properties of the various compounds, which may be green samples or cured samples as described in the table. Table 3 includes the green tack properties, the green strength, the crosslinking density, and the compression set of the different examples after initial compounding and again after aging for 7 days at 150° C., and after aging for 24 hours at 100° C.

building tack and green strength of compounds. A compound with a good balance of building tack and green strength as shown in the current disclosure is certainly favored for processing. The PEDM based compounds (E1.1-E1.8) showed comparable or modestly lower green tear strength but generally better cured tear strength in comparison to the control compound (C1.1). The PEDM based compounds (E1.1-E1.8) also showed better compression set than the control compound (C1.1) (e.g., about 25% improvement for E1.5 and E1.8). The PEDM based compounds (E1.1-E1.8) showed modest increase in tensile strength but good retention after heating in comparison to the control compound (C1.1). The PEDM based compounds (E1.1-E1.8) also showed comparable elongation but generally better retention in comparison to the control compound (C1.1). After oil aging, the PEDM based compounds (E1.1-E1.8) showed better retention in tensile strength and elongation than the control compounds (C1.1) and (C1.2).

TABLE 3

Compositions and Mechanical Properties

| Sample ID | C1.1 | C1.2 | E1.1 | E1.2 | E1.3 | E1.4 | E1.5 | E1.6 | E1.7 | E1.8 |
|---|---|---|---|---|---|---|---|---|---|---|
| PEDM ID | No PEDM | No PEDM | PEDM-1 | PEDM-1 | PEDM-2 | PEDM-2 | PEDM-3 | PEDM-3 | PEDM-4 | PEDM-4 |
| PEDM loading (phr) | 0 | 0 | 10 | 20 | 10 | 20 | 10 | 20 | 10 | 20 |
| ESCOREZ ™ 5600 (phr) | 0 | 5 | 0 | 0 | 0 | 0 | 0 | 0 | 0 | 0 |
| Properties in green state | | | | | | | | | | |
| Building tack (g/inch) | 1157 | 1724 | 2130 | 2456 | 2035 | 2104 | 2310 | 3983 | 1859 | 2047 |
| Building tack after aging at room temperature for 1 month | 1258 | 1632 | 1570 | 4174 | 1845 | 4086 | 1647 | 2494 | 1806 | 1550 |
| Compound ML (MU) | 110 | 108 | 104 | 97 | 105 | 98 | 113 | 108 | 107 | 101 |
| Stress @ 10% strain (MPa) | 0.36 | 0.35 | 0.38 | 0.35 | 0.36 | 0.34 | 0.37 | 0.37 | 0.36 | 0.35 |
| Stress 25% strain (MPa) | 0.50 | 0.47 | 0.50 | 0.46 | 0.49 | 0.45 | 0.49 | 0.51 | 0.49 | 0.47 |
| Die C Tear Strength (N/mm) | 5.0 | 5.0 | 4.6 | 4.5 | 4.8 | 4.5 | 4.9 | 4.9 | 4.7 | 4.5 |
| Curing properties | | | | | | | | | | |
| MH − ML (dN · m) | 7.4 | 6.1 | 6.2 | 5.4 | 6.1 | 5.5 | 6.3 | 5.4 | 6.2 | 5.6 |
| t90 (min) | 5.1 | 5.1 | 5.1 | 5.2 | 5.2 | 5.3 | 5.1 | 5.1 | 5.2 | 5.2 |
| ts2 (min) | 0.64 | 0.73 | 0.72 | 0.79 | 0.74 | 0.64 | 0.72 | 0.79 | 0.73 | 0.79 |
| Properties after cure (press cure at 180° C. for 30 min) | | | | | | | | | | |
| Hardness (Shore A) | 71 | 69 | 70 | 70 | 72 | 70 | 71 | 71 | 70 | 72 |
| Tensile Strength (MPa) | 15.9 | 15.2 | 14.3 | 11.2 | 14.8 | 13.0 | 14.3 | 13.0 | 14.3 | 13.0 |
| Elongation (%) | 223 | 251 | 211 | 192 | 229 | 207 | 208 | 206 | 212 | 213 |
| Die C Tear Strength (N/mm) | 28 | 32 | 30 | 27 | 34 | 31 | 33 | 29 | 33 | 32 |
| Compression Set (%)* | 7.9 | 7.4 | 7.6 | 6.8 | 6.5 | 7.0 | 5.9 | 7.4 | 6.8 | 5.8 |
| Hardness (Shore A) | 77 | 76 | 75 | 75 | 77 | 76 | 77 | 76 | 76 | 77 |
| Tensile Strength (MPa) | 16.4 | 16.2 | 14.8 | 12.7 | 15.3 | 14.8 | 14.6 | 13.8 | 15.1 | 13.9 |
| Elongation (%) | 197 | 247 | 198 | 192 | 199 | 194 | 187 | 188 | 198 | 198 |
| Tensile Retained (%) | 103 | 107 | 103 | 114 | 103 | 113 | 102 | 106 | 106 | 107 |
| Elongation Retained (%) | 89 | 98 | 94 | 100 | 87 | 94 | 90 | 91 | 93 | 93 |
| Properties after oil aging at 100° C. for 24 hours (after press cure at 180° C. for 30 min) | | | | | | | | | | |
| Tensile Strength (MPa) | 7.2 | 7.5 | 7.7 | 6.9 | 8.3 | 7.1 | 7.6 | 6.9 | 7.3 | 6.9 |
| Elongation (%) | 120 | 138 | 137 | 133 | 141 | 123 | 126 | 129 | 131 | 126 |
| Tensile Retained (%) | 45 | 50 | 54 | 61 | 56 | 54 | 53 | 53 | 51 | 53 |
| Elongation Retained (%) | 54 | 55 | 65 | 69 | 62 | 59 | 61 | 63 | 62 | 59 |

*Compression set samples were press-cured for 35 min at 180° C.

In green stage, all the inventive PEDM-based compounds (E1.1-E1.8) showed improvement in building tack over the control compound (C1.1), which was also higher than that from the control compound (C1.2). The compound containing PEDM-3 (E1.5 and E1.6) showed the highest tack improvement, yet comparable green strength as the control compound (C1.1), while the green strength of the control compound (C1.2) is lower than that of the control compound (C1.1). In general, at a loading level of 10 phr of PEDM, the PEDM compounds (PEDM 1-4) show comparable green strength as the control compound (C1.1). The compounds containing PEDM-3 showed high tack improvement when compared to the compounds that do not include the described formulation. There is generally trade-off between Table 4 shows Garvey die extrusion properties of the PEDM based compounds (E1.1-E1.8). The PEDM based compounds (E1.2, E1.6 and E1.8) showed higher extrusion output without failure of profile appearance at higher extrusion rate than the control compound (C1.1). The compound containing PEDM-1 (E1.2) showed the highest extrusion output without failure of profile appearance at the highest extrusion rate. Hence, improved extrusion output upon PEDM addition was also observed.

TABLE 4

| Garvey Die Extrusion Properties | | | |
|---|---|---|---|
| Sample ID | Extrusion Rate (rpm) | Extrusion Output (g/min) | Failure of profile appearance? |
| C1.1 | 100 | 121 | No |
| | 150 | 180 | Yes (at corner) |
| E1.2 | 100 | 118 | No |
| | 150 | 176 | No |
| | 170 | 186 | No |
| | 190 | 215 | Yes (at corner) |
| E1.6 | 100 | 119 | No |
| | 150 | 176 | No |
| | 170 | 196 | Yes (at corner) |
| E1.8 | 100 | 118 | No |
| | 150 | 177 | No |
| | 170 | 191 | Yes (at corner) |

Example 2. The following examples are EP(D)M-based compounds produced with addition of the PEDM polymers listed in Table 1, thus using EP(D)M polymer crystalline VISTALON™ 7001 and amorphous VISTALON™ 2502. Crystalline VISTALON™ 7001 is an ethylene-propylene copolymer having a Mooney Viscosity (ML, 1+4 @ 125° C.) of 60 MU and an ethylene content of 73 wt %, and amorphous VISTALON™ 2502, which is an ethylene-propylene copolymer having a Mooney Viscosity (ML, 1+4 @ 125° C.) of 26 MU and an ethylene content of 49 wt %. Such elastomeric formulations were found to be suitable for conveyor belt applications, for example. The amorphous VISTALON™ 2502 was replaced with PEDM in the inventive compounds. Two tackifiers, ESCOREZ™ 5600 and ESCOREZ™ 5400, were also used in the comparative examples. ESCOREZ™ 5600 and ESCOREZ™ 5400 are both DCPD-based compounds with ESCOREZ™ 5400 being hydrogenated, while ESCOREZ™ 5600 has 10% aromaticity. The softening point of ESCOREZ™ 5600 and ESCOREZ™ 5400 is about 100° C. Both PEDM and the tackifier were also used for the production of the PEDM based compounds (E5-E6) to evaluate potential synergies of the two tackifying materials ESCOREZ™ 5600 and ESCOREZ™ 5400. In general, the EP(D)M compounds with PEDM showed significant improvement in building tack over the control, which was higher than the compounds with the ESCOREZ™ resins. By using the PEDM and ESCOREZ™ resins together, the balance of building tack and physical strengths was improved.

Table 5 illustrates a peroxide-cured EP(D)M conveyor formulation. The control formulation included crystalline VISTALON™ 7001 and amorphous VISTALON™ 2502 at a ratio of (50:50). The polymer content was 100 phr, which included both VISTALON™ 7001 and VISTALON™ 2502 EP(D)M control polymers and PEDM; i.e., a portion of the VISTALON™ 2502 EP(D)M was replaced by the PEDM polymer at a level of 20 phr. ESCOREZ™ 5600 and ESCOREZ™ 5400 were added at 5 phr in two formulations as comparative examples (C2.2-C2.3). The compounding was conducted in 1.8 liter intermesh mixer. Batches were removed at 156° C. (maximum). Curatives were mixed on open mill for about 8 minutes.

Compounds were cured using compression molding at 160° C. for 8 minutes. The ML and Mooney scorch properties of the compounds were determined according to the ASTM D1646 method. MRD was measured by the ASTM D5289 method. Hardness was measured by the ASTM D2240 method. Tensile and elongation after oil aging is measured according to ASTM D471 test method. Tear strength was measured by the ASTM D624 method. Aging with heat was conducted at 150° C. for 168 hours. Picma tack is a measure of the tack between two surfaces. Generally, two unvulcanized calendered rubber sheets are kept in contact under constant load for a specified time. The force required to pull the sheets apart is measured as tack. Unless otherwise specified the two layers of uncured rubber are the same composition. Herein, a Picma Tack Tester, Type PI (available from Toyoseiki) having a measurement range from 0.1 N to 15 N in 0.1 N steps was used. The sheets were prepared by roll milling at 80° C. and the nip-gap is adjusted to achieve a sheet of 2.0 mm±0.1 mm. A first sheet was secured to a cylinder weight sample holder, and the sample in which the first sheet contacted was a second sheet. The contact time was 30 seconds, the rate of extension was 25 mm/min, and the applied dead weight was 500 gram-force (4.9 N). The measurements were performed at 23° C. Abrasion resistance was measured by the DIN 53516 method.

TABLE 5

| Formulation | |
|---|---|
| Ingredient | Phr |
| First Pass | |
| VISTALON ™ 7001 + VISTALON ™ 2502 + PEDM | 100 |
| Carbon Black N330 | 50 |
| TMQ (ANTAGE RD-G) | 1.50 |
| ZINC OXIDE | 10.00 |
| HIGH VISCOSITY PARAFFINIC OIL (IPOL 2300) | 12.00 |
| ESCOREZ ™ 5600 or ESCOREZ ™ 5400 (optional) | 5 |
| Second Pass | |
| DICUMYL PEROXIDE (PERKADOX ™ BC-40 K-PD) | 7.50 |
| TRIALLYL CYANURATE-TAC 50 | 2.00 |
| TOTAL: | 183 |

Table 6 shows the building tack, curing, mechanical and aging properties of the inventive compounds (E1-E6) and the comparative control compounds (C2.1-C2.3).

In comparison between the PEDM based compounds (E2.1-E2.4) and the control compounds (C2.1-C2.3), the PEDM based compounds (E2.1-E2.4) showed higher improvement in building tack than the ESCOREZ™-based compounds (C2.2-C2.3) against the control compound (C2.1). After curing, the PEDM based compounds (E2.1-E2.4) showed higher hardness but lower elongation and tear strength than the control compounds (C2.2-C2.3). The PEDM based compound (E2.1) showed better abrasion resistance than the control compounds (C2.2-C2.3), while the PEDM based compounds (E2.2-E2.4) showed comparable abrasion resistance as the control compounds (C2.2-C2.3). The PEDM based compounds (E2.1-E2.4) showed better retention in tensile than the control compound (C2.1), which is consistent with the control compounds (C2.2-C2.3).

With addition of both PEDM and ESCOREZ™, the PEDM based compounds (E2.5) and (E2.6) showed some synergies resulting from the combination of PEDM and ESCOREZ™. For example, in comparison to the control compounds (C2.2-C2.3) (ESCOREZ™ only) and the PEDM based compound (E2.1) (PEDM only), the PEDM based compounds (E2.5-E2.6) showed building tack comparable with (or closer to) the PEDM based compound (E2.1), elongation comparable to the control compound (C2.2) (versus E2.5). The abrasion resistance of the PEDM based compounds (E2.5-E2.6) are between that of the PEDM based compound (E2.1), and the control compounds (C2.2) and (C3), which is comparable to that of the control compound (C2.1). In general, the PEDM based compound (E2.5) containing the aromatic ESCOREZ™ 5600 showed a better balance of physical strengths and tack than the PEDM based compound (E2.6) containing the hydrogenated ESCOREZ™ 5400, which is not obvious in the examples where the control compounds contained the ESCOREZ™ resins only, such as the control compounds (C2.2-C2.3). Additionally, the ML of the PEDM based compound (E2.5-E2.6) was the lowest among the compounds tested, as observed in Table 6, which would result in easier processing. Therefore, use of both PEDM and ESCOREZ™ together in the compounds is a formulation that can bring advantages over the formulations using either one or the other alone.

The polymer characteristics of the PEDM and EP(D)M polymers used in the study are shown in Table 7. Melting temperature ($T_m$) and heat of fusion ($H_f$) were determined by differential scanning calorimetry (DSC) using commercially available equipment such as a Perkin Elmer Pyris 1 Thermal Analysis System. Typically, 10 mg to 15 mg of the sample, that has been stored at room temperature for at least 48 hours, was sealed in an aluminum pan and loaded into the instrument at room temperature. The sample was heated to 170° C. and equilibrated at 170° C. for 3 minutes, then cooled at 10° C./min to −70° C., followed by an equilibration at −70° C. for 3 minutes, and then heated at a heating rate of 10° C./min to 170° C. The values of $T_m$ and $H_f$ are calculated from the second heating cycle.

TABLE 6

| Compounds Properties | | | | | | | | | |
|---|---|---|---|---|---|---|---|---|---|
| Sample ID | C2.1 | C2.2 | C2.3 | E2.1 | E2.2 | E2.3 | E2.4 | E2.5 | E2.6 |
| VISTALON ™ 7001 loading (phr) | 50 | 50 | 50 | 50 | 50 | 50 | 50 | 50 | 50 |
| VISTALON ™ 2502 loading (phr) | 50 | 50 | 50 | 30 | 30 | 30 | 30 | 30 | 30 |
| PEDM ID | N.A. | N.A. | N.A. | PEDM-1 | PEDM-4 | PEDM-3 | PEDM-2 | PEDM-1 | PEDM-1 |
| PEDM loading (phr) | 0 | 0 | 0 | 20 | 20 | 20 | 20 | 20 | 20 |
| ESCOREZ ™ ID | N.A. | 5600 | 5400 | N.A. | N.A. | N.A. | N.A. | 5600 | 5400 |
| ESCOREZ ™ loading (phr) | 0 | 5 | 5 | 0 | 0 | 0 | 0 | 5 | 5 |
| Properties in green state | | | | | | | | | |
| Picma tack (kg) | 0.36 | 0.52 | 0.55 | 0.80 | 0.65 | 0.94 | 0.64 | 0.78 | 0.71 |
| Compound ML (MU) | 67 | 65 | 64 | 66 | 65 | 76 | 66 | 62 | 62 |
| Curing properties | | | | | | | | | |
| MH − ML (dN · m) | 22.7 | 18.6 | 20.1 | 20.3 | 20.7 | 20.5 | 21.3 | 16.2 | 17.8 |
| t90 (min) | 18.7 | 18.7 | 18.9 | 18.9 | 19.0 | 19.0 | 19.3 | 18.8 | 19.0 |
| ts2 (min) | 11.4 | 12.1 | 12.7 | 12.7 | 11.6 | 11.5 | 12.3 | 12.2 | 13.5 |
| Peak Rate (dNm/min) | 2.5 | 2.0 | 2.1 | 2.1 | 2.1 | 2.2 | 2.2 | 1.8 | 1.9 |
| Properties after cure (press cure at 180° C. for 30 min) | | | | | | | | | |
| Hardness (Shore A) | 68.2 | 66.3 | 66.3 | 68.1 | 68.0 | 68.4 | 68.2 | 65.4 | 65.5 |
| Tensile Strength (MPa) | 20.9 | 18.7 | 18.7 | 17.0 | 18.2 | 17.1 | 16.0 | 17.9 | 15.7 |
| Elongation (%) | 270 | 320 | 301 | 250 | 270 | 250 | 240 | 330 | 260 |
| Die C Tear Strength (N/mm) | 30.9 | 34.8 | 33.3 | 28.4 | 28.7 | 29.5 | 31.0 | 31.6 | 30.2 |
| Abrasion Loss ($mm^3$) | 87 | 107 | 113 | 96 | 108 | 115 | 111 | 103 | 102 |
| Properties after oven aging at 150° C. for 7 days (after press cure at 180° C. for 30 min) | | | | | | | | | |
| Hardness (Shore A) | 74.9 | 74.2 | 73.8 | 76.3 | 75.5 | 76.4 | 76.0 | 74.0 | 74.3 |
| Tensile Strength (MPa) | 17.4 | 19.5 | 18.6 | 16.8 | 15.2 | 15.5 | 16.2 | 16.5 | 15.3 |
| Elongation (%) | 230 | 290 | 260 | 230 | 210 | 210 | 220 | 260 | 240 |
| Hardness Retained (%) | 110 | 112 | 111 | 112 | 111 | 112 | 111 | 113 | 113 |
| Tensile Retained (%) | 83 | 104 | 100 | 99 | 84 | 91 | 102 | 93 | 97 |
| Elongation Retained (%) | 85 | 91 | 86 | 92 | 78 | 84 | 92 | 79 | 92 |

Example 3. The following examples of the present disclosure (E3.1-E3.8) demonstrated that 50 phr of PEDM can impart improved tack and processing to EP(D)M-based compounds without significant reduction of the mechanical properties (before and after aging) and curing properties.

PEDM polymers with a different ethylene content (5% to 15%) and a different ENB level (2% to 10%) were added at 50 phr (in replacement of VISTALON™ 2502) to EP(D)M formulations. The results showed tack improvement due to the addition of PEDM polymers. Lower Mooney viscosity and enhanced tack will reduce the possibility of layer separation, which provides advantages in processing and potentially overall performance of conveyor belt.

TABLE 7

| Characteristics of PEDM polymers | | | | | | | | |
|---|---|---|---|---|---|---|---|---|
| PEDM ID | C2 % | ENB % | ML | $T_m$ (° C.) | $H_f$ (J/g) | $M_n$ (g/mol) | $M_w$ (g/mol) | $M_w/M_n$ |
| PEDM-5 | 20.7 | 0.4 | 11 | N.D | N.D | 56014 | 136888 | 2.44 |
| PEDM-6 | 18.1 | 4.5 | 14 | N.D | N.D | 67292 | 152129 | 2.26 |
| PEDM-7 | 16.3 | 9.6 | 17 | N.D | N.D | 71660 | 162915 | 2.27 |
| PEDM-8 | 17.1 | 18.6 | 19 | N.D | N.D | 77081 | 197297 | 2.56 |
| VISTALON ™ 7001 | 73 | 5.0 | 60 | 25 | 39 | N.D. | N.D. | N.D. |
| VISTALON ™ 2502 | 50 | 4.2 | 25 | N.D. | N.D. | N.D. | N.D. | N.D. |

In Table 8, the respective amount of the EP(D)M plus PEDM polymers is depicted as in Examples E3.1-E3.4. During mixing of the formulations, the master batches (without curatives) were mixed on Lab scale 1.8 liter intermesh mixer. The batches were passed through the mixer at 156° C. maximum. Conventional mixing process was used with the mixer filler factor maintained at 75%. Curatives were mixed on open mill for about 8 minutes.

TABLE 8

| Blend Compositions and Conditions | | | | | |
|---|---|---|---|---|---|
| Ingredients | C3.1 | E3.1 | E3.2 | E3.3 | E3.4 |
| First Pass Masterbatch | | | | | |
| VISTALON ™ 7001 (phr) | 50.00 | 50.00 | 50.00 | 50.00 | 50.00 |
| VISTALON ™ 2502 (phr) | 50.00 | | | | |
| N330 Carbon Black (phr) | 50.00 | 50.00 | 50.00 | 50.00 | 50.00 |
| Stearic acid (phr) | 1.50 | 1.50 | 1.50 | 1.50 | 1.50 |
| Antioxidant TMQ (ANTAGE ™ RD-G) (phr) | 1.50 | 1.50 | 1.50 | 1.50 | 1.50 |
| ZnO (phr) | 10.00 | 10.00 | 10.00 | 10.00 | 10.00 |
| IPOL ™ 2300-Paraffinic oil (phr) | 15.00 | 15.00 | 15.00 | 15.00 | 15.00 |
| PEDM-1 | | 50.00 | | | |
| PEDM-4 | | | 50.00 | | |
| PEDM-3 | | | | 50.00 | |
| PEDM-2 | | | | | 50.00 |
| Second Pass Final Batch | | | | | |
| Multi Pass Level I (phr) | 178.00 | 178.00 | 178.00 | 178.00 | 178.00 |
| Sulfur (phr) | 1.00 | 1.00 | 1.00 | 1.00 | 1.00 |
| MBTS (phr) | 1.20 | 1.20 | 1.20 | 1.20 | 1.20 |
| TMTD (phr) | 0.80 | 0.80 | 0.80 | 0.80 | 0.80 |
| ZDBC (phr) | 2.20 | 2.20 | 2.20 | 2.20 | 2.20 |
| ZDEC (phr) | 0.75 | 0.75 | 0.75 | 0.75 | 0.75 |
| DPTT (phr) | 0.75 | 0.75 | 0.75 | 0.75 | 0.75 |
| Total (phr) | 184.70 | 369.40 | 184.70 | 184.70 | 184.70 |

The compound properties of the un-vulcanized compounds are illustrated in Table 9. Compound viscosity of the PEDM based compounds (E3.1, E3.2, and E3.4) was found to be lower than the VISTALON™ 2502-containing control compound (C3.1), which has potential advantage in processing on extruders and calendars. Likewise, the scorch time at 125° C. of PEDM based compounds (E3.1, E3.2, and E3.4) was slightly higher than the control compound (C1), because of the lower compound Mooney viscosity and may thus have higher scorch safety during processing. The PEDM based compound (E3.3) showed higher Mooney viscosity and lower scorch time than the control compound (C3.1) and the PEDM based compounds (E3.1, E3.2, and E3.4), due to the higher ML of PEDM-3 than VISTALON™ 2502 and PEDM-1, PEDM-4, and PEDM-2. Hence, PEDM can be used as a blend partner with crystalline EP(D)M grades in sulfur cure formulation in order to improve processing.

TABLE 9

| Compound Properties | | | | | |
|---|---|---|---|---|---|
| Mooney Viscosity | C3.1 | E3.1 | E3.2 | E3.3 | E3.4 |
| ML(1 + 4)@100° C. (MU) | 62.0 | 55.8 | 53.3 | 80.3 | 56.4 |
| Mooney Scorch @125° C. | | | | | |
| t5 (min) | 5.69 | 6.12 | 6.08 | 5.48 | 5.91 |
| t35 (min) | 8.92 | 9.51 | 9.70 | 8.45 | 8.93 |

Table 10 shows the moving die rheometer of the PEDM based compounds (E3.1, E3.2, E3.3, and E3.4). For PEDM based compounds (E3.1, E3.2, E3.3, and E3.4), MDR values showed a slight drop in MH-ML values, which may come from their lower ENB % content and/or ethylene content. Furthermore, the cure time (ts2 and tc90) of the PEDM based compounds (E3.1, E3.2, E3.3, and E3.4) was comparable to that of the VISTALON™ 2502-containing control compound (C3.1). Also, t90 of PEDM based compound (E3.4) was lower than that of the PEDM based compounds (E3.1, E3.2, and E3.3) due to the higher ENB % content of PEDM-2.

TABLE 10

| Moving Die Rheology | | | | | |
|---|---|---|---|---|---|
| Moving die rheometer @ 160° C./60 minutes | C3.1 | E3.1 | E3.2 | E3.3 | E3.4 |
| ML (dNm) | 1.72 | 1.50 | 1.42 | 2.15 | 1.53 |
| MH (dNm) | 26.22 | 22.94 | 23.35 | 23.65 | 23.79 |
| MH-ML (dNm) | 24.50 | 21.44 | 21.93 | 21.50 | 22.26 |
| ts2 (min) | 0.97 | 1.01 | 1.04 | 0.97 | 0.97 |
| t50 (min) | 2.06 | 2.16 | 2.18 | 2.06 | 1.96 |
| t90 (min) | 5.23 | 5.67 | 5.61 | 5.60 | 5.15 |

The compound properties of the vulcanized compounds are illustrated in Table 11. The compounds were cured using compression molding at 160° C. for 8 minutes and properties were evaluated as shown below. The tensile strength of the PEDM based compounds (E3.1 to E3.3) showed a modest decrease in comparison to that of the VISTALON™ 2502-containing control compound (C3.1). The PEDM based compound (E3.4) showed comparable tensile strength as the VISTALON™ 2502-containing control compound (C3.1), which is higher than the PEDM based compounds (E3.1, E3.2, and E3.3) and may come from the higher ENB % content of PEDM-2. The Die C tear strength of the PEDM based compounds were found to be comparable with that of the VISTALON™ 2502-containing control compound (C3.1). After aging at 150° C. for 168 hours, the physical properties of the PEDM based compounds (E3.1, E3.2, E3.3, and E3.4) showed comparable to higher retention than that of the VISTALON™ 2502-containing control compound (C3.1).

TABLE 11

| Compound Properties | | | | | |
|---|---|---|---|---|---|
| Physical Properties-original | C3.1 | E3.1 | E3.2 | E3.3 | E3.4 |
| Hardness (Shore A) | 71 | 71 | 71 | 71 | 72 |
| 100% mod (MPa) | 3.16 | 3.17 | 3.23 | 3.25 | 3.41 |
| 200% mod (MPa) | 6.95 | 6.75 | 6.80 | 7.04 | 7.38 |
| 300% mod (MPa) | 11.17 | 10.54 | 10.78 | 11.34 | 11.82 |
| Tensile at break (MPa) | 18.00 | 16.42 | 16.26 | 15.09 | 17.44 |
| Elongation at break (%) | 390 | 400 | 400 | 370 | 380 |
| Die C tear (N/mm) | 32.57 | 31.68 | 31.86 | 31.88 | 31.31 |
| Retention (air ageing 150° C. for 168 hrs.) | | | | | |
| Change in Hardness (Shore A) | 10 | 10 | 9 | 9 | 9 |
| Tensile at break (%) | 89 | 90 | 89 | 101 | 96 |
| Elongation at break (%) | 44 | 40 | 43 | 49 | 47 |
| Die C tear (%) | 70 | 78 | 76 | 77 | 71 |

Table 12 illustrates the picma tack, compression set, and abrasion resistance of the PEDM based compounds (E3.1, E3.2, E3.3, and E3.4). The picma test property was measured on the green compounds to evaluate the tackiness of the inventive compounds. In comparison to the control compound (C3.1), the PEDM based compounds (E3.1 and E3.4) showed higher tack, while the PEDM based compounds (E3.2 and E3.3) showed comparable tack. The difference in tack of the PEDM compounds may come from the lower C2 content or MW of the PEDM based compounds (E3.1 and E3.4) than PEDM based compounds (E3.2 and E3.3).

Regarding the compression set (%), the elasticity performance of the PEDM based compounds was comparable to the control compound (C3.1) at higher temperature in spite of lower ENB content of the PEDM grades like the PEDM based compounds (E3.1, E3.2, and E3.3). At room temperature, the control compound (C3.1) showed better elasticity performance than the PEDM based compounds (E3.1, E3.2, E3.3, and E3.4).

The abrasion resistance of PEDM based compounds (E3.1 to E3.4) was lower than that of the control compound (C3.1).

TABLE 12

| Picma Tack, Compression Set, and Abrasion Resistance Properties | | | | | |
|---|---|---|---|---|---|
| Picma Tack Tester | C3.1 | E3.1 | E3.2 | E3.3 | E3.4 |
| Tack Self (kg) | 0.97 | 1.30 | 1.02 | 0.89 | 1.25 |
| Compression set | | | | | |
| Compression Set (%) (25%/72 hr/RT) | 14 | 26 | 25 | 26 | 27 |
| Compression Set (%) (25%/72 hr/100° C.) | 52 | 57 | 61 | 52 | 50 |
| Compression Set (%) (25%/72 hr/125° C.) | 68 | 73 | 72 | 65 | 69 |
| Abrasion resistance (Rotary drum) | | | | | |
| Abrasion Loss ($mm^3$) | 91 | 99 | 130 | 128 | 134 |

Table 13 illustrates the characteristics of several additional blend compositions using VISTALON™ 7001 and PEDM, thus with PEDM polymers comprising different ENB content. PEDM polymers with different ENB content were mixed with identical formulations and properties are depicted in Table 13.

TABLE 13

| Blend Compositions and Conditions | | | | | | |
|---|---|---|---|---|---|---|
| | C3.3 | C3.4 | E3.5 | E3.6 | E3.7 | E3.8 |
| First Pass Master Batch | | | | | | |
| VISTALON ™ 7001 (phr) | 50.00 | 50.00 | 50.00 | 50.00 | 50.00 | 50.00 |
| VISTALON ™ 2502 (phr) | 50.00 | 50.00 | | | | |
| N330 Carbon Black (phr) | 50.00 | 50.00 | 50.00 | 50.00 | 50.00 | 50.00 |
| Stearic acid (LUBRISTIC ™ 995) (phr) | 1.50 | 1.50 | 1.505 | 1.50 | 1.50 | 1.50 |
| Antioxidant TMQ (ANTAGE ™ RD-G) (phr) | 1.50 | 1.50 | 1.50 | 1.50 | 1.50 | 1.50 |
| ZnO (phr) | 10.00 | 10.00 | 10.00 | 10.00 | 10.00 | 10.00 |
| HV (Paraffinic oil) | 15.00 | 15.00 | 15.00 | 15.00 | 15.00 | 15.00 |
| Phenolic resin (phr) | | 5.00 | | | | |
| PEDM-5 (phr) | | | 50.00 | | | |
| PEDM-6 (phr) | | | | 50.00 | | |
| PEDM-7 (phr) | | | | | 50.00 | |
| PEDM-8 (phr) | | | | | | 50.00 |
| Second Pass Final Batch | | | | | | |
| Multipass level I (phr) | 178.00 | 183.00 | 178.00 | 178.00 | 178.00 | 178.00 |
| Sulfur (phr) | 1.00 | 1.00 | 1.00 | 1.00 | 1.00 | 1.00 |
| MBTS(Accel DM) (phr) | 1.20 | 1.20 | 1.20 | 1.20 | 1.20 | 1.20 |
| TMTD ( Accel TMT-R) (phr) | 0.80 | 0.80 | 0.80 | 0.80 | 0.80 | 0.80 |
| ZDBC (phr) | 2.20 | 2.20 | 2.20 | 2.20 | 2.20 | 2.20 |
| ZDEC (phr) | 0.75 | 0.75 | 0.75 | 0.75 | 0.75 | 0.75 |
| DPTT (phr) | 0.75 | 0.75 | 0.75 | 0.75 | 0.75 | 0.75 |
| Total (phr) | 184.70 | 189.70 | 184.70 | 184.70 | 184.70 | 184.70 |

The rheological properties of the PEDM based compounds (E3.5-E3.8) are illustrated in Table 14. Compared to the control compounds (C3.3) and (C3.4), the Mooney viscosity of the compounds was found to be dependent on the Mooney viscosity, the C3.2 content, and the ENB content of the polymer. The PEDM based compounds (E3.5, E3.6 and E3.7) showed lower Mooney viscosity when compared to the control compounds (C3.3) and (C3.4), as well as the PEDM based compounds (E3.8). The PEDM based compound (E3.8) showed higher Mooney viscosity when compared to the control compounds (C3.3) and (C3.4). Regarding the scorch time of the compounds, the PEDM based compound (E3.8) having high ENB content showed lower scorch time (t5 and t35) when compared to the control compounds (C3.3) and (C3.4).

The MDR data showed that for PEDM based compound with higher ENB content (e.g., E3.6, E3.7, and E3.8) showed higher MH-ML, whereas PEDM based compound with lower ENB content (E3.5) showed lower MH-ML value, therefore lower crosslink density. Furthermore, the PEDM based compounds (E3.6 to E3.8) having higher ENB content showed lower cure time (tc90) values when compared to the control compounds (C3.3) and (C3.4).

TABLE 14

| Rheological Properties | | | | | | |
|---|---|---|---|---|---|---|
| Mooney Viscosity | C3.3 | C3.4 | E3.5 | E3.6 | E3.7 | E3.8 |
| ML(1 + 4) @ 100° C. (MU) | 61.3 | 60.0 | 50.0 | 54.3 | 58.2 | 62.2 |
| Mooney Scorch at 125° C. | | | | | | |
| t5 (min) | 6.07 | 5.73 | 6.30 | 5.70 | 5.07 | 4.61 |
| t35 (min) | 9.47 | 8.92 | 10.00 | 8.97 | 7.82 | 7.18 |
| MDR at 160° C. | | | | | | |
| ML (dNm) | 1.72 | 1.58 | 1.45 | 1.50 | 1.55 | 1.58 |
| MH (dNm) | 26.84 | 23.70 | 15.13 | 25.33 | 25.90 | 24.58 |
| MH − ML (dNm) | 25.12 | 22.12 | 13.68 | 23.83 | 24.35 | 23.00 |

TABLE 14-continued

| Rheological Properties | | | | | | |
|---|---|---|---|---|---|---|
| Mooney Viscosity | C3.3 | C3.4 | E3.5 | E3.6 | E3.7 | E3.8 |
| ts2 (min) | 0.99 | 0.94 | 1.09 | 0.98 | 0.89 | 0.85 |
| tc90 (min) | 5.65 | 6.41 | 5.89 | 5.52 | 5.02 | 4.79 |

Further compositions properties are illustrated in Table 15. The PEDM based compounds (E3.5 to E3.8) shows better tack when compare to the control compound (C3.3). The improvement in tack was from 13% to 69%, when compared to EP(D)M formulation (C3.3), which is a very important property for multilayer applications. It was also observed that the tensile properties were improved with increase in ENB content (E3.5-E3.8), when compared to the control compounds.

TABLE 15

| Compositions Properties | | | | | | |
|---|---|---|---|---|---|---|
| Physical Properties | C3.3 | C3.4 | E3.5 | E3.6 | E3.7 | E3.8 |
| Hardness (Shore A) | 73 | 73 | 68 | 73 | 74 | 76 |
| 100% modulus (MPa) | 3.257 | 2.895 | 2.708 | 3.31 | 3.351 | 3.662 |
| 300% modulus (MPa) | 11.332 | 9.309 | 8.448 | 11.24 | 11.895 | 12.989 |
| Tensile strength (MPa) | 17.271 | 16.022 | 10.928 | 16.521 | 16.961 | 19.158 |
| Elongation at Break (%) | 390 | 420 | 360 | 390 | 380 | 390 |
| Tear strength (Die C) (kN/M) | 33.507 | 34.15 | 24.01 | 31.097 | 33.747 | 33.993 |
| Picma Tack Tester | | | | | | |
| Tack-Self (kg) | 0.92 | 1.17 | 1.04 | 1.20 | 1.39 | 1.56 |

Blend compositions including EP(D)M/PEDM (70:30) and EP(D)M/PEDM (30:70) were also prepared, characterized, and evaluated, as shown in Table 16. Higher blend of PEDM (70 phr) increased the tack performance. On the other hand, higher blend of PEDM (70 phr) decreased the Mooney viscosity and the physical properties of the compounds. PEDM based compounds (E13 and E14) showed higher Picma tack values than the phenolic resin-containing control compounds C4. Therefore, compositions of the present disclosure showed better tack for multi-layer products like conveyor belt, hose, and the like. Lower compound Mooney viscosity can improve calendaring, and extrusion.

TABLE 16

| Blend Compositions and Properties | | | | | | | |
|---|---|---|---|---|---|---|---|
| Formulation | C3.5 | C3.6 | E3.9 | E3.10 | C3.4 | E3.13 | E3.14 |
| Masterbatch | | | | | | | |
| VISTALON ™ 7001 (phr) | 70.00 | 30.00 | 70.00 | 30.00 | 50.00 | 70.00 | 30.00 |
| VISTALON ™ 2502 (phr) | 30.00 | 70.00 | | | 50.00 | | |
| N330 Carbon Black (phr) | 50.00 | 50.00 | 50.00 | 50.00 | 50.00 | 50.00 | 50.00 |
| Stearic acid (phr) | 1.50 | 1.50 | 1.50 | 1.50 | 1.50 | 1.50 | 1.50 |
| Anti-oxidant TMQ (phr) | 1.50 | 1.50 | 1.50 | 1.50 | 1.50 | 1.50 | 1.50 |
| ZnO (phr) | 10.00 | 10.00 | 10.00 | 10.00 | 10.00 | 10.00 | 10.00 |
| HV (Paraffinic oil) (phr) | 15.00 | 15.00 | 15.00 | 15.00 | 15.00 | 15.00 | 15.00 |
| Phenolic resin (phr) | | | | | 5.00 | 5.00 | 5.00 |
| PEDM-6 (phr) | | | 30.00 | 70.00 | | | |
| PEDM-7 (phr) | | | | | | 30.00 | 70.00 |
| Final Batch | | | | | | | |
| Sulfur (phr) | 1.00 | 1.00 | 1.00 | 1.00 | 1.00 | 1.00 | 1.00 |
| MBTS (phr) | 1.20 | 1.20 | 1.20 | 1.20 | 1.20 | 1.20 | 1.20 |

TABLE 16-continued

| Blend Compositions and Properties | | | | | | | |
|---|---|---|---|---|---|---|---|
| Formulation | C3.5 | C3.6 | E3.9 | E3.10 | C3.4 | E3.13 | E3.14 |
| TMTD (phr) | 0.80 | 0.80 | 0.80 | 0.80 | 0.80 | 0.80 | 0.80 |
| ZDBC (phr) | 2.20 | 2.20 | 2.20 | 2.20 | 2.20 | 2.20 | 2.20 |
| ZDEC (phr) | 0.75 | 0.75 | 0.75 | 0.75 | 0.75 | 0.75 | 0.75 |
| DPTT (phr) | 0.75 | 0.75 | 0.75 | 0.75 | 0.75 | 0.75 | 0.75 |
| Total (phr) | 184.70 | 184.70 | 184.70 | 184.70 | 189.70 | 189.70 | 189.70 |
| Properties | | | | | | | |
| ML(1 + 4) at 100° C. (MU) | 70.2 | 53.9 | 66.6 | 43.7 | 60.0 | 68.1 | 48.4 |
| Hardness (Shore A) | 75 | 72 | 75 | 72 | 73 | 76 | 74 |
| 100% mod (MPa) | 3.47 | 3.20 | 3.36 | 3.22 | 2.90 | 3.36 | 3.08 |
| 200% mod (MPa) | 7.47 | 6.84 | 7.52 | 6.66 | 5.83 | 6.45 | 5.83 |
| 300% mod (MPa) | 11.99 | 10.65 | 12.45 | 10.33 | 9.31 | 9.98 | 8.80 |
| Tensile strength (MPa) | 19.55 | 16.16 | 18.19 | 13.14 | 16.02 | 18.90 | 14.86 |
| Elongation at break (%) | 400 | 400 | 380 | 360 | 420 | 440 | 420 |
| Picma Tack test | | | | | | | |
| Tack-Self (kg) | 0.66 | 1.09 | 0.95 | 1.41 | 1.17 | 1.21 | 1.60 |

All documents described herein are incorporated by reference herein, including any priority documents and/or testing procedures to the extent they are not inconsistent with this text. As is apparent from the foregoing general description and the specific embodiments, while some embodiments have been illustrated and described, various modifications can be made without departing from the spirit and scope of the disclosure. Accordingly, it is not intended that the disclosure be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

What is claimed is:

1. An elastomeric composition comprising:

5 parts by weight per hundred parts by weight rubber (phr) to 80 phr of a propylene-a-olefin-diene (PEDM) terpolymer comprising 55 wt % to 95 wt % propylene, 2.5 wt % to 40 wt % a-olefin, and 0.05 wt % to 25 wt % diene, said wt % based on the weight of the PEDM terpolymer, wherein the PEDM terpolymer has Mooney viscosity (ML(1+4)) of 5 MU to 90 MU, and wherein the PEDM terpolymer has a weight average molecular weight of 120,000 g/mol to 320,000 g/mol;

20 phr to 95 phr of an ethylene-based copolymer selected from the group consisting of:

(a) a crystalline ethylene-based copolymer comprising 60 wt % to 95 wt % ethylene, 0 wt % to 10 wt % of one or more dienes, and 5 wt % to 40 wt % C3 to C12 a-olefin, said wt % based on a total weight of the crystalline ethylene-based copolymer, (b) an amorphous ethylene-based copolymer comprising 40 wt % to 59 wt % ethylene, 0 wt % to 10 wt % of one or more dienes, and 40 wt % to 60 wt % C3 to C12 a-olefin, said wt % based on a total weight of the amorphous ethylene-based copolymer, and (c) a combination of (a) and (b);

10 phr to 200 phr of a process oil; and wherein the elastomeric composition comprises:

a green strength ranging from 0.4 MPa to 0.9 MPa; and a Mooney viscosity (ML(1+4)) at 100° C. from 50 MU to 115 MU.

2. The elastomeric composition of claim 1 comprising:

5 phr to 80 phr of the PEDM terpolymer;

20 phr to 95 phr of the crystalline ethylene-based copolymer;

0 phr to 75 phr of the amorphous ethylene-based copolymer; and 10 phr to 30 phr of the process oil.

3. The elastomeric composition of claim 1, wherein the crystalline ethylene-based copolymer has a Mooney viscosity (ML(1+4)) at 125° C. of 20 MU to 90 MU.

4. The elastomeric composition of claim 1, wherein the crystalline ethylene-based copolymer has an Hf of 15 J/g or greater.

5. The elastomeric composition of claim 1, wherein the amorphous ethylene-based copolymer has a Mooney viscosity (ML(1+4)) at 125° C. of 20 MU to 90 MU.

6. The elastomeric composition of claim 1, wherein the amorphous ethylene-based copolymer has an Hf from 0 J/g to 14 J/g.

7. The elastomeric composition of claim 1, wherein the PEDM terpolymer has a number average molecular weight of 50,000 g/mol to 150,000 g/mol.

8. The elastomeric composition of claim 1, wherein the PEDM terpolymer has a polydispersity index of 2 to 2.7.

9. The elastomeric composition of claim 1, further comprising carbon black at 1 phr to 500 phr.

10. The elastomeric composition of claim 1 comprising:

5 phr to 50 phr of the PEDM;

50 phr to 95 phr of the ethylene-based copolymer; and 10 phr to 200 phr of the process oil.

11. The elastomeric composition of claim 10, wherein the elastomeric composition has a green rubber-to-rubber tack force of 500 g of force/inch width or greater.

12. The elastomeric composition of claim 10, wherein the elastomeric composition has a green rubber-to-rubber tack force of 1000 g of force/inch width to 5000 g of force/inch width.

13. The elastomeric composition of claim 12, wherein the elastomeric composition has a green rubber-to-rubber tack force of 1500 g of force/inch width to 4000 g of force/inch width.

14. The elastomeric composition of claim 10, wherein the elastomeric composition has a rubber-to-rubber tack force after aging at room temperature for 1 month of 500 g of force/inch width or greater.

15. The elastomeric composition of claim 10, wherein the elastomeric composition has a rubber-to-rubber tack force after aging at room temperature for 1 month of 1000 g of force/inch width or greater to 6000 g of force/inch width.

16. The elastomeric composition of claim 10, wherein the elastomeric composition has a percent retention in a green rubber-to-rubber tack force from blending to aging at room temperature for 1 month of 50% to 250%.

17. The elastomeric composition of claim 10, wherein the elastomeric composition has a percent retention in a green rubber-to-rubber tack force from blending to aging at room temperature for 1 month of 100% to 250%.

18. A hose comprising:

an inner rubber tubular;

a reinforcing fabric around the inner rubber tubular; and a rubber layer around the reinforcing fabric;

wherein the inner rubber tubular and/or the rubber layer comprise the elastomeric composition of claim 2.

19. The hose of claim 18, wherein the reinforcing fabric is selected from the group consisting of: cotton, polyester, polyamide, acrylic, aramid, polyketone, hemp, jute, fiberglass, and any combination thereof.

20. A belt comprising: a first outer rubber layer;

a second outer rubber layer; and a reinforcing fabric between the first and second outer rubber layers;

wherein the first outer rubber layer and/or the second outer rubber layer comprise the elastomeric composition of claim 2.

21. The belt of claim 20, wherein the reinforcing fabric is selected from the group consisting of: cotton, polyester, polyamide, acrylic, aramid, polyketone, hemp, jute, fiberglass, and any combination thereof.

22. The belt of claim 20, wherein the reinforcing fabric is selected from the group consisting of: cotton, polyester, polyamide, acrylic, aramid, polyketone, hemp, jute, fiberglass, and any combination thereof.

23. A belt comprising: a first outer rubber layer;

a second outer rubber layer; and alternating layers of rubber skim layers and reinforcing fabrics between the first and second outer rubber layers;

wherein the first outer rubber layer and/or the second outer rubber layer and/or the rubber skim layers comprise the elastomeric composition of claim 2.

* * * * *